(12) United States Patent
Bennett

(10) Patent No.: US 9,406,252 B2
(45) Date of Patent: Aug. 2, 2016

(54) ADAPTIVE MULTI-STANDARD VIDEO CODER SUPPORTING ADAPTIVE STANDARD SELECTION AND MID-STREAM SWITCH-OVER

(75) Inventor: James D. Bennett, Hroznetin (CZ)

(73) Assignee: BROADCOM CORPORATION, Irvine, CA (US)

( * ) Notice: Subject to any disclaimer, the term of this patent is extended or adjusted under 35 U.S.C. 154(b) by 443 days.

(21) Appl. No.: 13/285,644

(22) Filed: Oct. 31, 2011

(65) Prior Publication Data

US 2012/0047229 A1 Feb. 23, 2012

Related U.S. Application Data

(63) Continuation-in-part of application No. 12/982,199, filed on Dec. 30, 2010, which is a continuation-in-part of application No. 12/982,330, filed on Dec. 30, 2010.

(60) Provisional application No. 61/541,938, filed on Sep. 30, 2011, provisional application No. 61/291,818, filed on Dec. 31, 2009, provisional application No. 61/303,119, filed on Feb. 10, 2010.

(51) Int. Cl.
*H04N 7/26* (2006.01)
*G09G 3/20* (2006.01)
*G02B 27/22* (2006.01)
*G09G 3/00* (2006.01)
(Continued)

(52) U.S. Cl.
CPC ... *G09G 3/20* (2013.01); *G02B 27/22* (2013.01); *G02B 27/2228* (2013.01); *G09G 3/003* (2013.01); *H04N 21/2221* (2013.01); *H04N 21/23439* (2013.01); *H04N 21/234309* (2013.01); *H04N 21/25825* (2013.01); *H04N 21/2665* (2013.01); *H04N 21/4122* (2013.01); *G09G 2300/023* (2013.01); *G09G 2320/028* (2013.01)

(58) Field of Classification Search
CPC .............. G06K 9/00; G06F 17/30038; G06F 17/30017; G06F 2009/4557
See application file for complete search history.

(56) References Cited

U.S. PATENT DOCUMENTS 7,822,132 B2 * 10/2010 Futaki et al. .................. 375/260
8,059,771 B2 * 11/2011 Kim et al. ..................... 375/347
(Continued)

*Primary Examiner* — Chikaodili E. Anyikire
*Assistant Examiner* — Kehinde O Abimbola
(74) *Attorney, Agent, or Firm* — Garlick & Markison; Shayne X. Short

(57) ABSTRACT

Adaptive multi-standard video coder supporting adaptive standard selection and mid-stream switch-over. Automatic or semi-automatic selection and reselection between various respective communication protocols or standards (e.g., or profiles of such protocols or standards, subsets of such protocols or standards, etc.) may be made based on any of a number of local and/or remote considerations. For example, characteristics associated with one or more other devices, communication links, communication networks, etc. within a communication system may direct the automatic or semiautomatic selection and reselection between such communication protocols or standards (e.g., or profiles thereof, or subsets thereof, etc.). Also, characteristics associated with local operating conditions (e.g., available processing resources, available memory, etc.) this may be used in accordance with making such selection and reselection. Moreover, consideration may be made with respect to which communication protocol/standard provides relative benefit over others based on a given communication systems present capabilities and conditions.

20 Claims, 21 Drawing Sheets

(51) Int. Cl.
*H04N 21/222* (2011.01)
*H04N 21/2343* (2011.01)
*H04N 21/258* (2011.01)
*H04N 21/2665* (2011.01)
*H04N 21/41* (2011.01)

(56) References Cited

U.S. PATENT DOCUMENTS

| | | | |
|---|---|---|---|
| 2007/0156924 A1* | 7/2007 | Ramalingam et al. | 709/246 |
| 2007/0220163 A1* | 9/2007 | Khouderchah | H04N 7/167 709/231 |
| 2008/0081648 A1* | 4/2008 | Kang et al. | 455/500 |
| 2008/0152028 A1* | 6/2008 | Futaki et al. | 375/260 |
| 2008/0165803 A1 | 7/2008 | Wu | |
| 2009/0135906 A1 | 5/2009 | Comer et al. | |
| 2010/0020866 A1 | 1/2010 | Marpe et al. | |
| 2010/0185777 A1* | 7/2010 | Kim et al. | 709/231 |
| 2011/0055864 A1* | 3/2011 | Shah | H04N 7/1675 725/31 |
| 2011/0161499 A1* | 6/2011 | Tsai | H04L 29/125 709/227 |

* cited by examiner

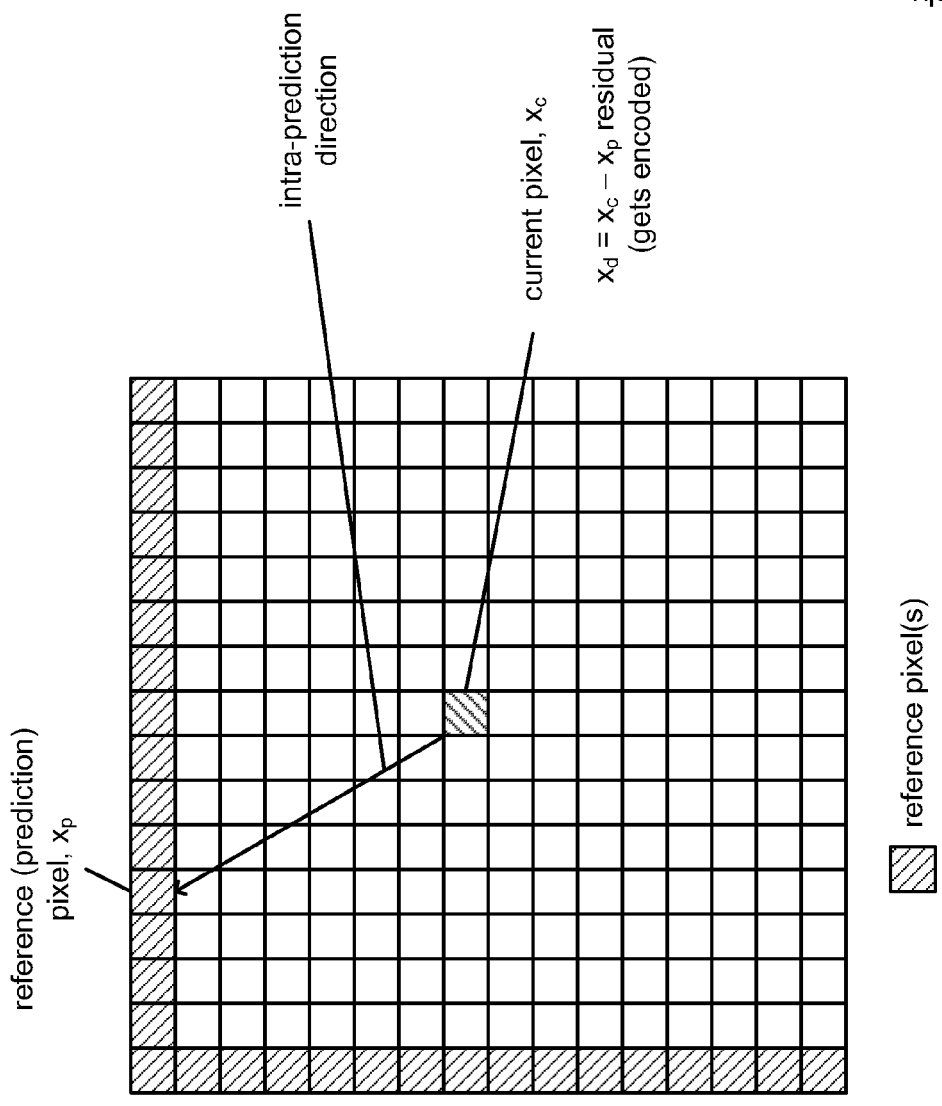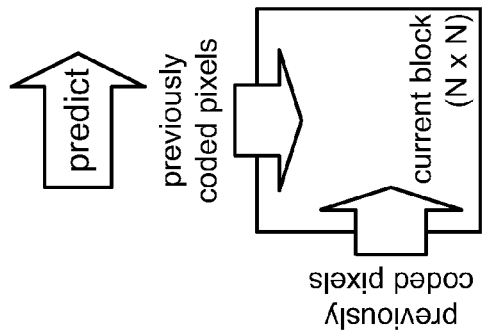
FIG. 7

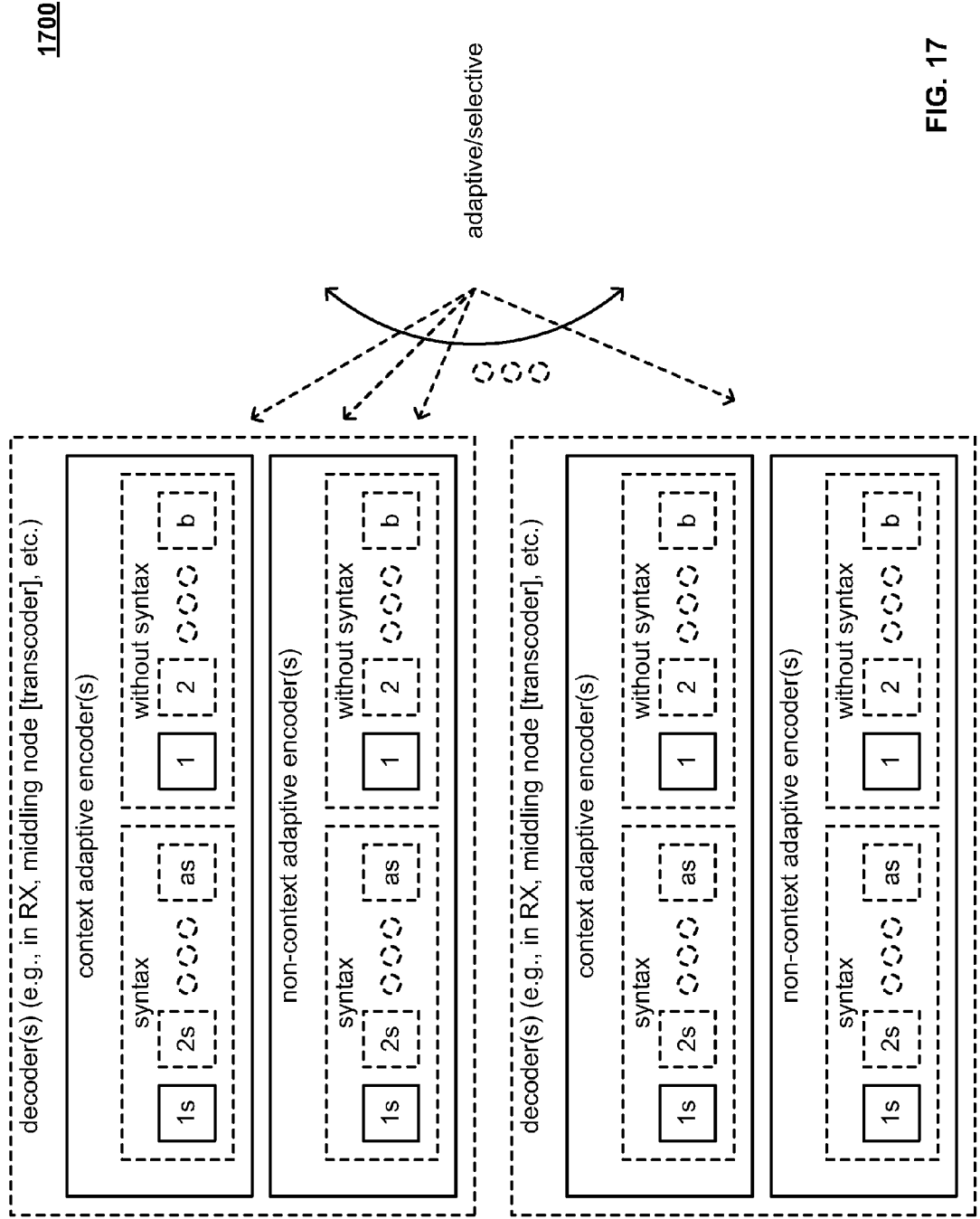

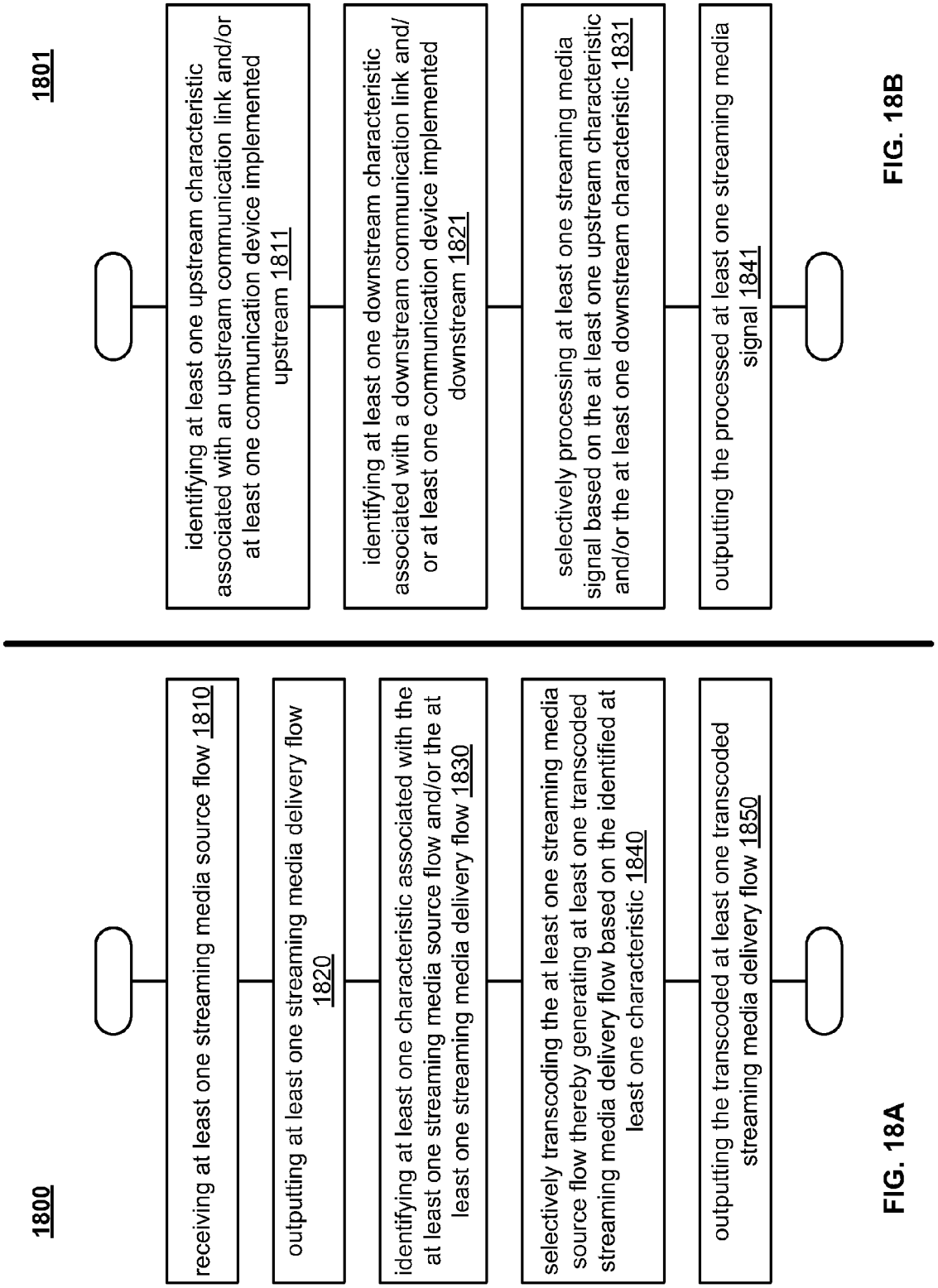

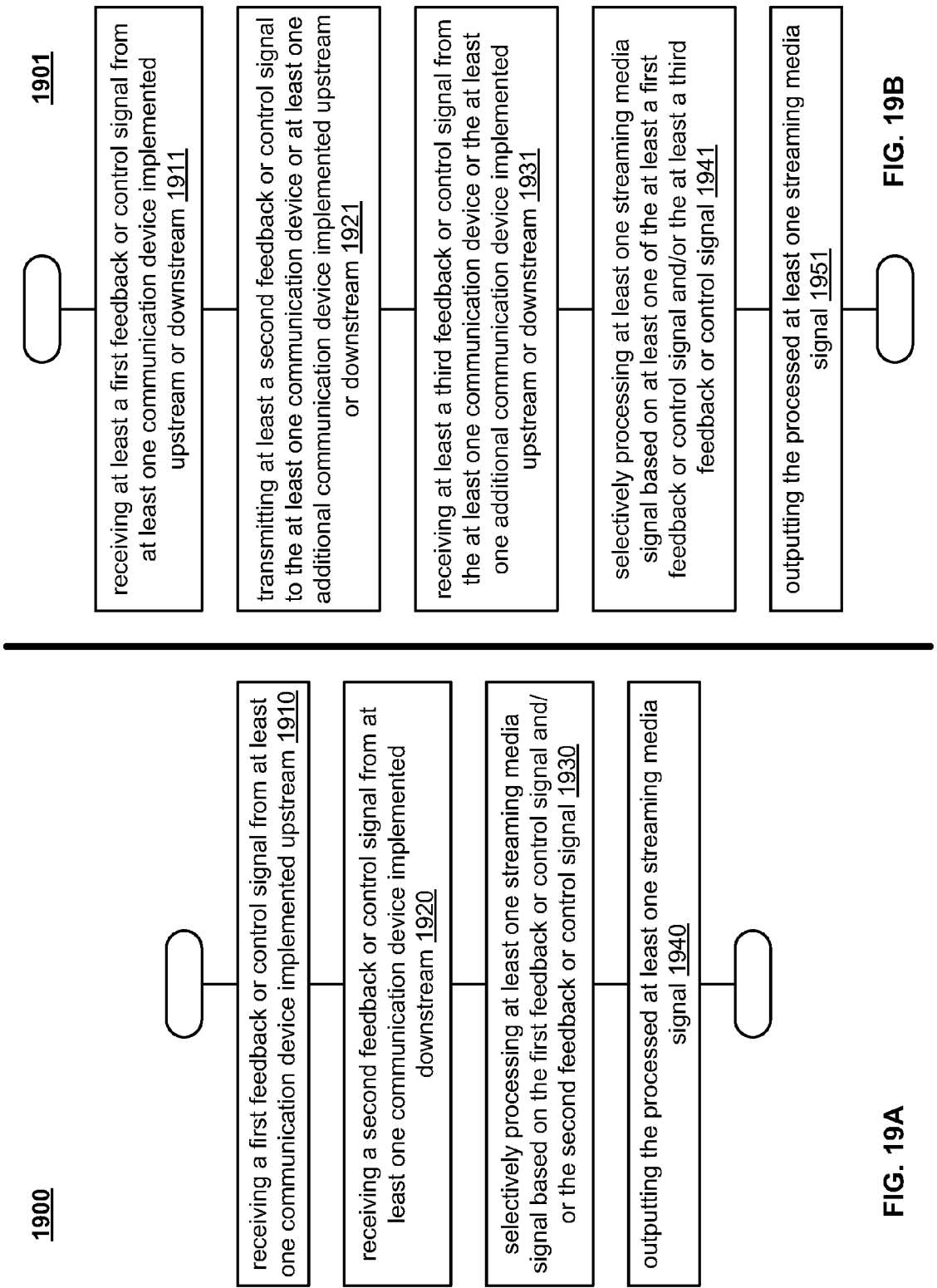

ADAPTIVE MULTI-STANDARD VIDEO CODER SUPPORTING ADAPTIVE STANDARD SELECTION AND MID-STREAM SWITCH-OVER

CROSS REFERENCE TO RELATED PATENTS/PATENT APPLICATIONS

Provisional Priority Claims

The present U.S. Utility Patent Application claims priority pursuant to 35 U.S.C. §119(e) to the following U.S. Provisional Patent Application which is hereby incorporated herein by reference in its entirety and made part of the present U.S. Utility Patent Application for all purposes:
1. U.S. Provisional Patent Application Ser. No. 61/541,938, entitled "Coding, communications, and signaling of video content within communication systems,", filed Sep. 30, 2011.

Continuation-in-Part (CIP) Priority Claims, 35 U.S.C. §120

The present U.S. Utility Patent Application claims priority pursuant to 35 U.S.C. §120, as a continuation-in-part (CIP), to the following U.S. Utility Patent Application which is hereby incorporated herein by reference in its entirety and made part of the present U.S. Utility Patent Application for all purposes:
1. U.S. Utility patent application Ser. No. 12/982,199, entitled "Transcoder supporting selective delivery of 2D, stereoscopic 3D, and multi-view 3D content from source video,", filed Dec. 30, 2010, pending, which claims priority pursuant to 35 U.S.C. §119(e) to the following U.S. Provisional Patent Applications which are hereby incorporated herein by reference in their entirety and made part of the present U.S. Utility Patent Application for all purposes:
    1.1. U.S. Provisional Patent Application Ser. No. 61/291,818, entitled "Adaptable image display,", filed Dec. 31, 2009.
    1.2. U.S. Provisional Patent Application Ser. No. 61/303,119, entitled "Adaptable image display,", filed Feb. 10, 2010.
The present U.S. Utility Patent Application also claims priority pursuant to 35 U.S.C. §120, as a continuation-in-part (CIP), to the following U.S. Utility Patent Application which is hereby incorporated herein by reference in its entirety and made part of the present U.S. Utility Patent Application for all purposes:
2. U.S. Utility patent application Ser. No. 12/982,330, entitled "Multi-path and multi-source 3D content storage, retrieval, and delivery,", filed Dec. 30, 2010, pending, which claims priority pursuant to 35 U.S.C. §119(e) to the following U.S. Provisional Patent Applications which are hereby incorporated herein by reference in their entirety and made part of the present U.S. Utility Patent Application for all purposes:
    2.1. U.S. Provisional Patent Application Ser. No. 61/291,818, entitled "Adaptable image display,", filed Dec. 31, 2009.
    2.2. U.S. Provisional Patent Application Ser. No. 61/303,119, entitled "Adaptable image display,", filed Feb. 10, 2010.

Incorporation by Reference

The following U.S. Utility Patent Application are hereby incorporated herein by reference in their entirety and made part of the present U.S. Utility Patent Application for all purposes:
1. U.S. Utility patent application Ser. No. 13/285,861, entitled "Streaming transcoder with adaptive upstream and downstream transcode coordination,", filed concurrently on Oct. 31, 2011, pending.
2. U.S. Utility patent application Ser. No. 13/285,779, entitled "Entropy coder supporting selective employment of syntax and context adaptation,", filed concurrently on Oct. 31, 2011, pending.

Incorporation by Reference

The following standards/draft standards are hereby incorporated herein by reference in their entirety and are made part of the present U.S. Utility Patent Application for all purposes:
1. "WD3: Working Draft 3 of High-Efficiency Video Coding, Joint Collaborative Team on Video Coding (JCT-VC)," of ITU-T SG16 WP3 and ISO/IEC JTC1/SC29/WG11, Thomas Wiegand, et al., $5^{th}$ Meeting: Geneva, CH, 16-23 Mar. 2011, Document: JCTVC-E603, 215 pages.
2. International Telecommunication Union, ITU-T, TELECOMMUNICATION STANDARDIZATION SECTOR OF ITU, H.264 (03/2010), SERIES H: AUDIOVISUAL AND MULTIMEDIA SYSTEMS, Infrastructure of audiovisual services-Coding of moving video, Advanced video coding for generic audiovisual services, Recommendation ITU-T H.264, also alternatively referred to as International Telecomm ISO/IEC 14496-10-MPEG-4 Part 10, AVC (Advanced Video Coding), H.264/MPEG-4 Part 10 or AVC (Advanced Video Coding), ITU H.264/MPEG4-AVC, or equivalent.

BACKGROUND OF THE INVENTION

1. Technical Field of the Invention

The invention relates generally to digital video processing; and, more particularly, it relates to performing encoding and/or transcoding of video signals accordance with such digital video processing.

2. Description of Related Art

Communication systems that operate to communicate digital media (e.g., images, video, data, etc.) have been under continual development for many years. With respect to such communication systems employing some form of video data, a number of digital images are output or displayed at some frame rate (e.g., frames per second) to effectuate a video signal suitable for output and consumption. Within many such communication systems operating using video data, there can be a trade-off between throughput (e.g., number of image frames that may be transmitted from a first location to a second location) and video and/or image quality of the signal eventually to be output or displayed. The present art does not adequately or acceptably provide a means by which video data may be transmitted from a first location to a second location in accordance with providing an adequate or acceptable video and/or image quality, ensuring a relatively low amount of overhead associated with the communications, relatively low complexity of the communication devices at respective ends of communication links, etc.

BRIEF DESCRIPTION OF THE SEVERAL VIEWS OF THE DRAWINGS

FIG. 7 is a diagram illustrating an embodiment of intra-prediction processing.

FIG. 17 illustrates an embodiment of various encoders and/or decoders that may be implemented within any of a number of types of communication devices.

FIG. 18A, FIG. 18B, FIG. 19A, FIG. 19B, FIG. 20A, FIG. 20B, FIG. 21A, and FIG. 21B illustrate various embodiment of methods as may be performed by one or more communication devices.

DETAILED DESCRIPTION OF THE INVENTION

Figure 1:
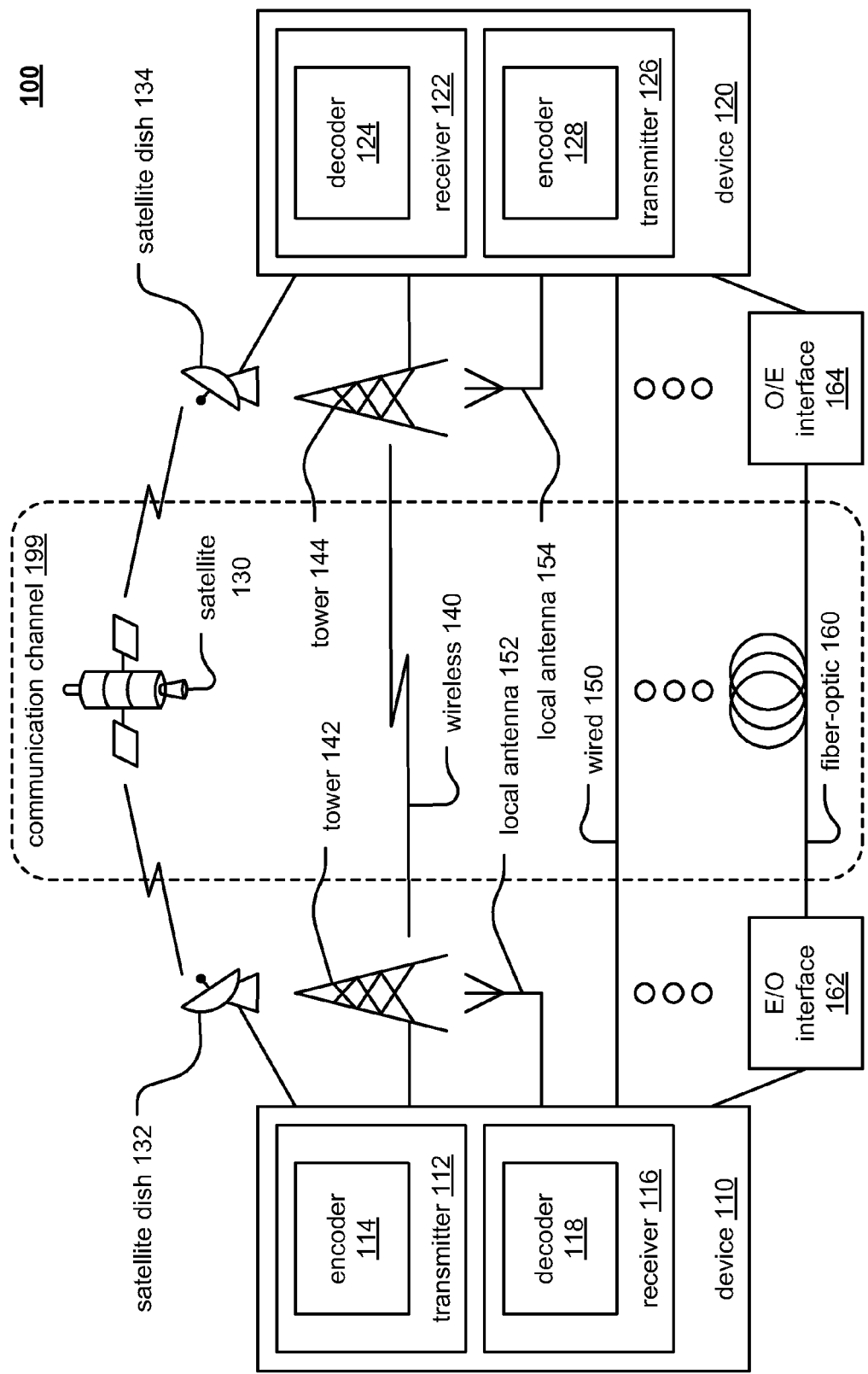
FIG. 1 and FIG. 2 illustrate various embodiments of communication systems.

Within many devices that use digital media such as digital video, respective images thereof, being digital in nature, are represented using pixels. Within certain communication systems, digital media can be transmitted from a first location to a second location at which such media can be output or displayed. The goal of digital communications systems, including those that operate to communicate digital video, is to transmit digital data from one location, or subsystem, to another either error free or with an acceptably low error rate. As shown in FIG. 1, data may be transmitted over a variety of communications channels in a wide variety of communication systems: magnetic media, wired, wireless, fiber, copper, and/or other types of media as well.

Figure 2:
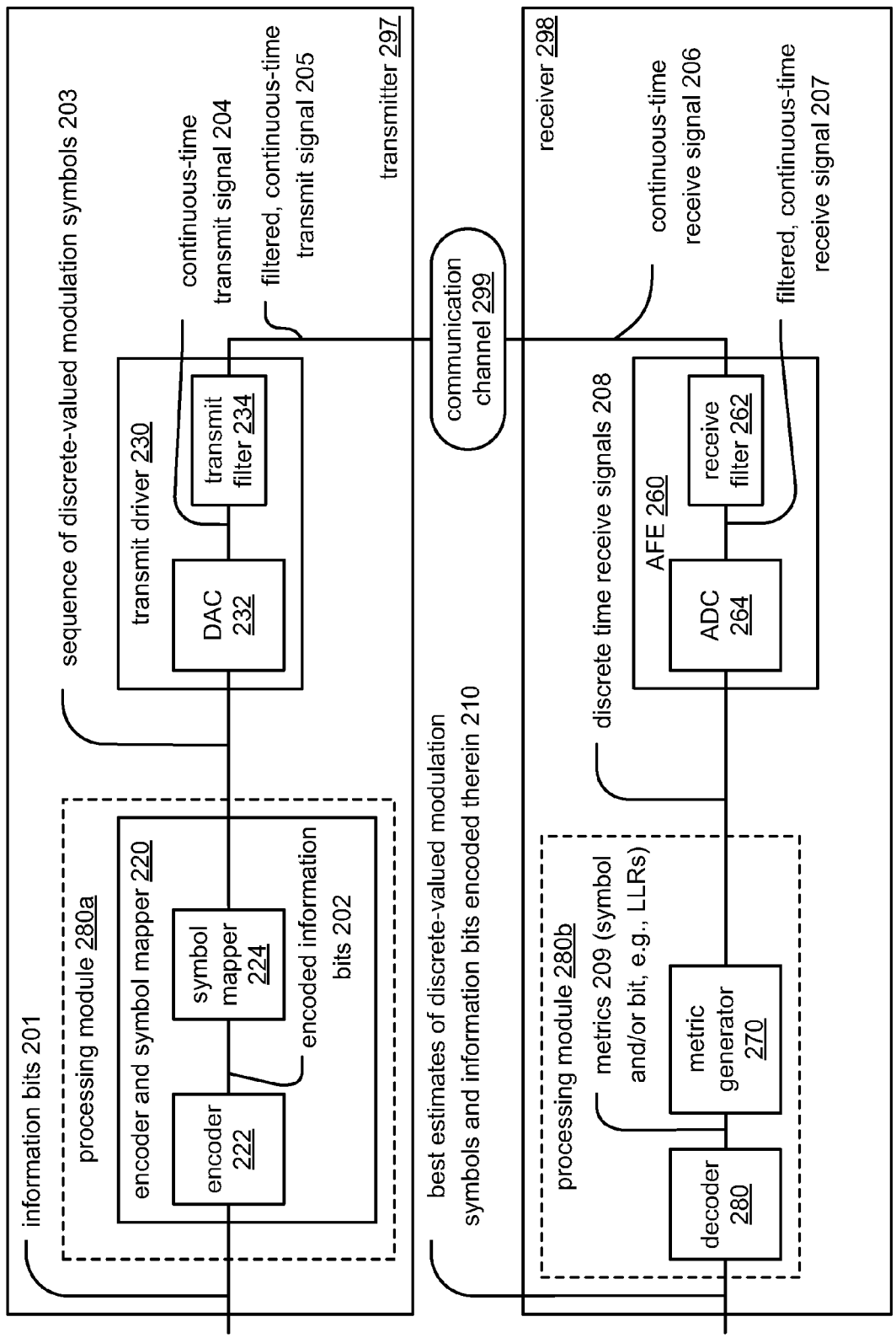

FIG. 1 and FIG. 2 are diagrams illustrate various embodiments of communication systems, 100 and 200, respectively.

Referring to FIG. 1, this embodiment of a communication system 100 is a communication channel 199 that communicatively couples a communication device 110 (including a transmitter 112 having an encoder 114 and including a receiver 116 having a decoder 118) situated at one end of the communication channel 199 to another communication device 120 (including a transmitter 126 having an encoder 128 and including a receiver 122 having a decoder 124) at the other end of the communication channel 199. In some embodiments, either of the communication devices 110 and 120 may only include a transmitter or a receiver. There are several different types of media by which the communication channel 199 may be implemented (e.g., a satellite communication channel 130 using satellite dishes 132 and 134, a wireless communication channel 140 using towers 142 and 144 and/or local antennae 152 and 154, a wired communication channel 150, and/or a fiber-optic communication channel 160 using electrical to optical (E/O) interface 162 and optical to electrical (O/E) interface 164)). In addition, more than one type of media may be implemented and interfaced together thereby forming the communication channel 199.

To reduce transmission errors that may undesirably be incurred within a communication system, error correction and channel coding schemes are often employed. Generally, these error correction and channel coding schemes involve the use of an encoder at the transmitter end of the communication channel 199 and a decoder at the receiver end of the communication channel 199.

Any of various types of ECC codes described can be employed within any such desired communication system (e.g., including those variations described with respect to FIG. 1), any information storage device (e.g., hard disk drives (HDDs), network information storage devices and/or servers, etc.) or any application in which information encoding and/or decoding is desired.

Generally speaking, when considering a communication system in which video data is communicated from one location, or subsystem, to another, video data encoding may generally be viewed as being performed at a transmitting end of the communication channel 199, and video data decoding may generally be viewed as being performed at a receiving end of the communication channel 199.

Also, while the embodiment of this diagram shows bi-directional communication being capable between the communication devices 110 and 120, it is of course noted that, in some embodiments, the communication device 110 may include only video data encoding capability, and the communication device 120 may include only video data decoding capability, or vice versa (e.g., in a uni-directional communication embodiment such as in accordance with a video broadcast embodiment).

Referring to the communication system 200 of FIG. 2, at a transmitting end of a communication channel 299, information bits 201 (e.g., corresponding particularly to video data in one embodiment) are provided to a transmitter 297 that is operable to perform encoding of these information bits 201 using an encoder and symbol mapper 220 (which may be viewed as being distinct functional blocks 222 and 224, respectively) thereby generating a sequence of discrete-valued modulation symbols 203 that is provided to a transmit driver 230 that uses a DAC (Digital to Analog Converter) 232 to generate a continuous-time transmit signal 204 and a transmit filter 234 to generate a filtered, continuous-time transmit signal 205 that substantially comports with the communication channel 299. At a receiving end of the communication channel 299, continuous-time receive signal 206 is provided to an AFE (Analog Front End) 260 that includes a receive filter 262 (that generates a filtered, continuous-time receive signal 207) and an ADC (Analog to Digital Converter) 264 (that generates discrete-time receive signals 208). A metric generator 270 calculates metrics 209 (e.g., on either a symbol and/or bit basis) that are employed by a decoder 280 to make best estimates of the discrete-valued modulation symbols and information bits encoded therein 210.

Within each of the transmitter 297 and the receiver 298, any desired integration of various components, blocks, functional blocks, circuitries, etc. Therein may be implemented. For example, this diagram shows a processing module 280a as including the encoder and symbol mapper 220 and all associated, corresponding components therein, and a processing module 280 is shown as including the metric generator 270 and the decoder 280 and all associated, corresponding components therein. Such processing modules 280a and 280b may be respective integrated circuits. Of course, other boundaries and groupings may alternatively be performed without departing from the scope and spirit of the invention. For example, all components within the transmitter 297 may be included within a first processing module or integrated circuit, and all components within the receiver 298 may be included within a second processing module or integrated circuit. Alternatively, any other combination of components within each of the transmitter 297 and the receiver 298 may be made in other embodiments.

As with the previous embodiment, such a communication system 200 may be employed for the communication of video data is communicated from one location, or subsystem, to another (e.g., from transmitter 297 to the receiver 298 via the communication channel 299).

Digital image and/or video processing of digital images and/or media (including the respective images within a digital video signal) may be performed by any of the various devices depicted below in FIG. 3A-3H to allow a user to view such digital images and/or video. These various devices do not include an exhaustive list of devices in which the image and/or video processing described herein may be effectuated, and it is noted that any generic digital image and/or video processing device may be implemented to perform the processing described herein without departing from the scope and spirit of the invention.

Figure 3:
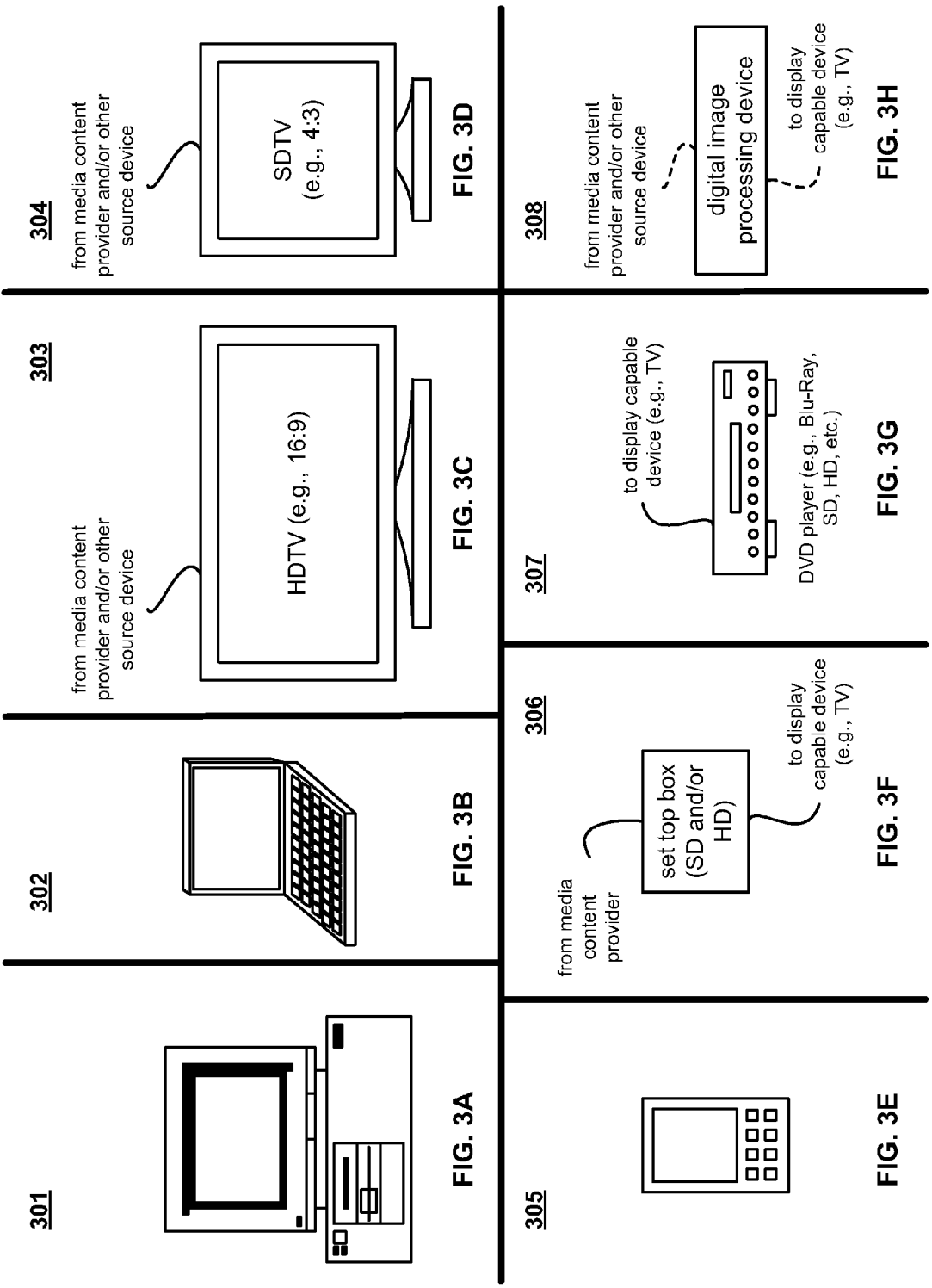
FIG. 3A illustrates an embodiment of a computer.
FIG. 3B illustrates an embodiment of a laptop computer.
FIG. 3C illustrates an embodiment of a high definition (HD) television.
FIG. 3D illustrates an embodiment of a standard definition (SD) television.
FIG. 3E illustrates an embodiment of a handheld media unit.
FIG. 3F illustrates an embodiment of a set top box (STB).
FIG. 3G illustrates an embodiment of a digital video disc (DVD) player.
FIG. 3H illustrates an embodiment of a generic digital image and/or video processing device.

FIG. 3A illustrates an embodiment of a computer 301. The computer 301 can be a desktop computer, or an enterprise storage devices such a server, of a host computer that is attached to a storage array such as a redundant array of independent disks (RAID) array, storage router, edge router, storage switch and/or storage director. A user is able to view still digital images and/or video (e.g., a sequence of digital images) using the computer 301. Oftentimes, various image and/or video viewing programs and/or media player programs are included on a computer 301 to allow a user to view such images (including video).

FIG. 3B illustrates an embodiment of a laptop computer 302. Such a laptop computer 302 may be found and used in any of a wide variety of contexts. In recent years, with the ever-increasing processing capability and functionality found within laptop computers, they are being employed in many instances where previously higher-end and more capable desktop computers would be used. As with the computer 301, the laptop computer 302 may include various image viewing programs and/or media player programs to allow a user to view such images (including video).

FIG. 3C illustrates an embodiment of a high definition (HD) television 303. Many HD televisions 303 include an integrated tuner to allow the receipt, processing, and decoding of media content (e.g., television broadcast signals) thereon. Alternatively, sometimes an HD television 303 receives media content from another source such as a digital video disc (DVD) player, set top box (STB) that receives, processes, and decodes a cable and/or satellite television broadcast signal. Regardless of the particular implementation, the HD television 303 may be implemented to perform image and/or video processing as described herein. Generally speaking, an HD television 303 has capability to display HD media content and oftentimes is implemented having a 16:9 widescreen aspect ratio.

FIG. 3D illustrates an embodiment of a standard definition (SD) television 304. Of course, an SD television 304 is somewhat analogous to an HD television 303, with at least one difference being that the SD television 304 does not include capability to display HD media content, and an SD television 304 oftentimes is implemented having a 4:3 full screen aspect ratio. Nonetheless, even an SD television 304 may be implemented to perform image and/or video processing as described herein.

FIG. 3E illustrates an embodiment of a handheld media unit 305. A handheld media unit 305 may operate to provide general storage or storage of image/video content information such as joint photographic experts group (JPEG) files, tagged image file format (TIFF), bitmap, motion picture experts group (MPEG) files, Windows Media (WMA/WMV) files, other types of video content such as MPEG4 files, etc. for playback to a user, and/or any other type of information that may be stored in a digital format. Historically, such handheld media units were primarily employed for storage and playback of audio media; however, such a handheld media unit 305 may be employed for storage and playback of virtual any media (e.g., audio media, video media, photographic media, etc.). Moreover, such a handheld media unit 305 may also include other functionality such as integrated communication circuitry for wired and wireless communications. Such a handheld media unit 305 may be implemented to perform image and/or video processing as described herein.

FIG. 3F illustrates an embodiment of a set top box (STB) 306. As mentioned above, sometimes a STB 306 may be implemented to receive, process, and decode a cable and/or satellite television broadcast signal to be provided to any appropriate display capable device such as SD television 304 and/or HD television 303. Such an STB 306 may operate independently or cooperatively with such a display capable device to perform image and/or video processing as described herein.

FIG. 3G illustrates an embodiment of a digital video disc (DVD) player 307. Such a DVD player may be a Blu-Ray DVD player, an HD capable DVD player, an SD capable DVD player, an up-sampling capable DVD player (e.g., from SD to HD, etc.) without departing from the scope and spirit of the invention. The DVD player may provide a signal to any appropriate display capable device such as SD television 304 and/or HD television 303. The DVD player 305 may be implemented to perform image and/or video processing as described herein.

FIG. 3H illustrates an embodiment of a generic digital image and/or video processing device 308. Again, as mentioned above, these various devices described above do not include an exhaustive list of devices in which the image and/or video processing described herein may be effectuated, and it is noted that any generic digital image and/or video processing device 308 may be implemented to perform the image and/or video processing described herein without departing from the scope and spirit of the invention.

Figure 4:
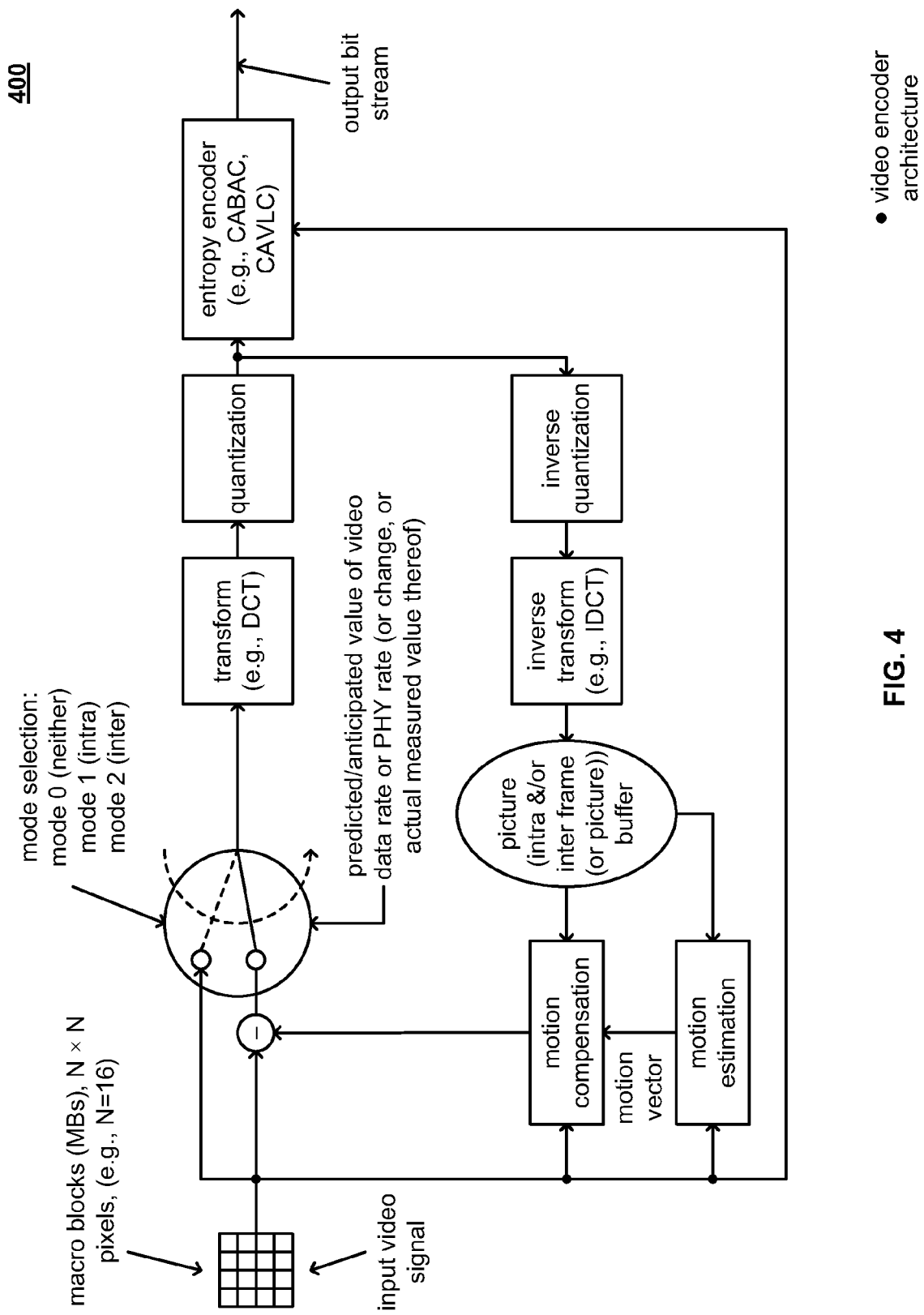
FIG. 4, FIG. 5, and FIG. 6 are diagrams illustrating various embodiments of video encoding architectures.
Figure 5:
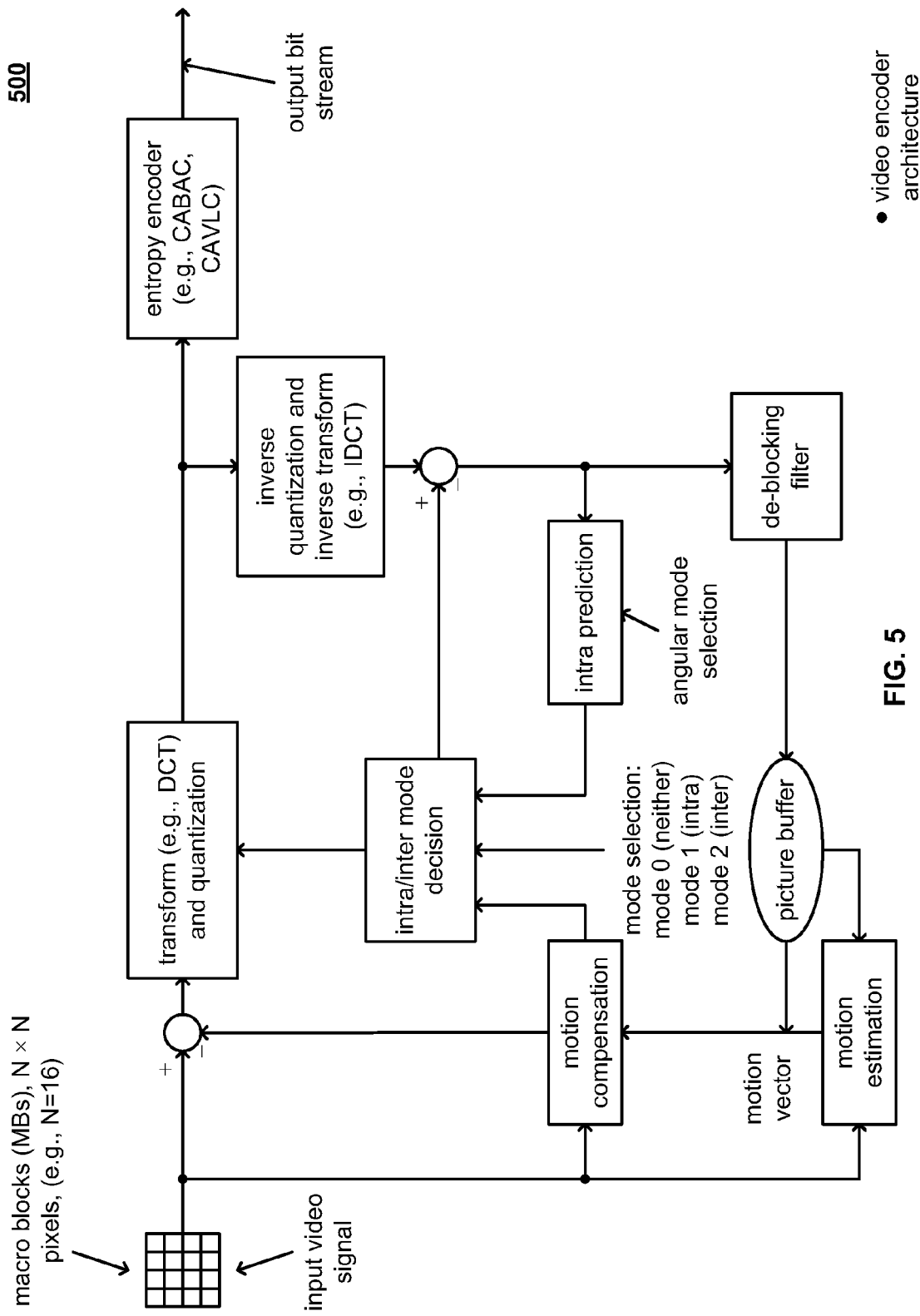
Figure 6:
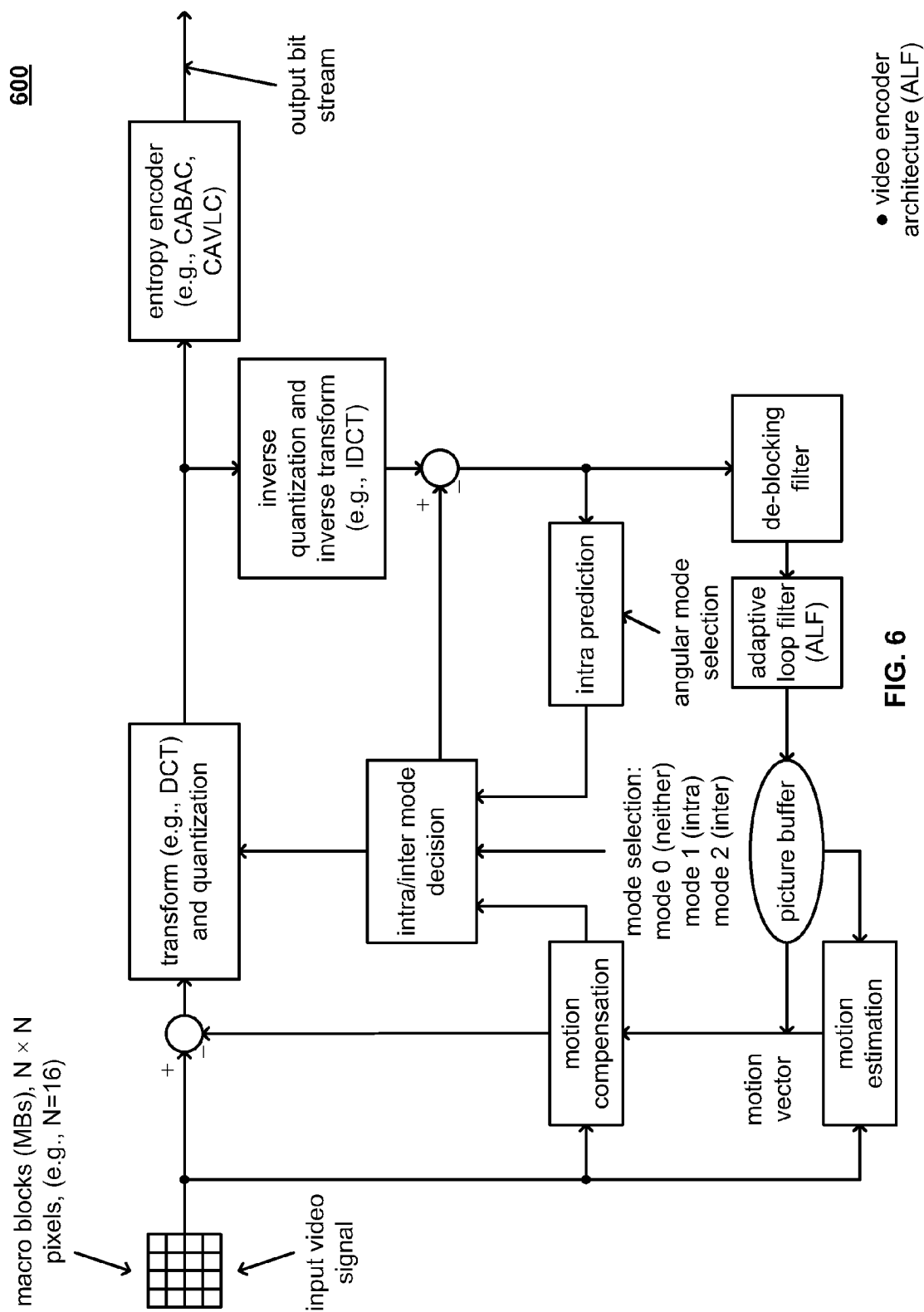

FIG. 4, FIG. 5, and FIG. 6 are diagrams illustrating various embodiments 400 and 500, and 600, respectively, of video encoding architectures.

Referring to embodiment 400 of FIG. 4, as may be seen with respect to this diagram, an input video signal is received by a video encoder. In certain embodiments, the input video signal is composed of macro-blocks. The size of such macro-blocks may be varied and can include a number of pixels typically arranged in a square shape. In one embodiment, such macro-blocks have a size of 16×16 pixels. However, it is generally noted that a macro-block may have any desired size such as N×N pixels, where N is an integer. Of course, some implementations may include non-square shaped macro-blocks, although square shaped macro-blocks are employed in a preferred embodiment.

The input video signal may generally be referred to as corresponding to raw frame (or picture) image data. For example, raw frame (or picture) image data may undergo processing to generate luma and chroma samples. In some embodiments, the set of luma samples in a macro-block is of one particular arrangement (e.g., 16×16), and set of the chroma samples is of a different particular arrangement (e.g., 8×8). In accordance with the embodiment depicted herein, a video encoder processes such samples on a block by block basis.

The input video signal then undergoes mode selection by which the input video signal selectively undergoes intra and/or inter-prediction processing. Generally speaking, the input video signal undergoes compression along a compression pathway. When operating with no feedback (e.g., in accordance with neither inter-prediction nor intra-prediction), the input video signal is provided via the compression pathway to undergo transform operations (e.g., in accordance with discrete cosine transform (DCT)). Of course, other transforms may be employed in alternative embodiments. In this mode of operation, the input video signal itself is that which is compressed. The compression pathway may take advantage of the lack of high frequency sensitivity of human eyes in performing the compression.

However, feedback may be employed along the compression pathway by selectively using inter- or intra-prediction video encoding. In accordance with a feedback or predictive mode of operation, the compression pathway operates on a (relatively low energy) residual (e.g., a difference) resulting from subtraction of a predicted value of a current macro-block from the current macro-block. Depending upon which form of prediction is employed in a given instance, a residual or difference between a current macro-block and a predicted value of that macro-block based on at least a portion of that same frame (or picture) or on at least a portion of at least one other frame (or picture) is generated.

The resulting modified video signal then undergoes transform operations along the compression pathway. In one embodiment, a discrete cosine transform (DCT) operates on a set of video samples (e.g., luma, chroma, residual, etc.) to compute respective coefficient values for each of a predetermined number of basis patterns. For example, one embodiment includes 64 basis functions (e.g., such as for an 8×8 sample). Generally speaking, different embodiments may employ different numbers of basis functions (e.g., different transforms). Any combination of those respective basis functions, including appropriate and selective weighting thereof, may be used to represent a given set of video samples. Additional details related to various ways of performing transform operations are described in the technical literature associated with video encoding including those standards/draft standards that have been incorporated by reference as indicated above. The output from the transform processing includes such respective coefficient values. This output is provided to a quantizer.

Generally, most image blocks will typically yield coefficients (e.g., DCT coefficients in an embodiment operating in accordance with discrete cosine transform (DCT)) such that the most relevant DCT coefficients are of lower frequencies. Because of this and of the human eyes' relatively poor sensitivity to high frequency visual effects, a quantizer may be operable to convert most of the less relevant coefficients to a value of zero. That is to say, those coefficients whose relative contribution is below some predetermined value (e.g., some threshold) may be eliminated in accordance with the quantization process. A quantizer may also be operable to convert the significant coefficients into values that can be coded more efficiently than those that result from the transform process. For example, the quantization process may operate by dividing each respective coefficient by an integer value and discarding any remainder. Such a process, when operating on typical macro-blocks, typically yields a relatively low number of non-zero coefficients which are then delivered to an entropy encoder for lossless encoding and for use in accordance with a feedback path which may select intra-prediction and/or inter-prediction processing in accordance with video encoding.

An entropy encoder operates in accordance with a lossless compression encoding process. In comparison, the quantization operations are generally lossy. The entropy encoding process operates on the coefficients provided from the quantization process. Those coefficients may represent various characteristics (e.g., luma, chroma, residual, etc.). Various types of encoding may be employed by an entropy encoder. For example, context-adaptive binary arithmetic coding (CABAC) and/or context-adaptive variable-length coding (CAVLC) may be performed by the entropy encoder. For example, in accordance with at least one part of an entropy coding scheme, the data is converted to a (run, level) pairing (e.g., data 14, 3, 0, 4, 0, 0, −3 would be converted to the respective (run, level) pairs of (0, 14), (0, 3), (1, 4), (2, −3)). In advance, a table may be prepared that assigns variable length codes for value pairs, such that relatively shorter length codes are assigned to relatively common value pairs, and relatively longer length codes are assigned for relatively less common value pairs.

As the reader will understand, the operations of inverse quantization and inverse transform correspond to those of quantization and transform, respectively. For example, in an embodiment in which a DCT is employed within the transform operations, then an inverse DCT (IDCT) is that employed within the inverse transform operations.

A picture buffer, alternatively referred to as a digital picture buffer or a DPB, receives the signal from the IDCT module; the picture buffer is operative to store the current frame (or picture) and/or one or more other frames (or pictures) such as may be used in accordance with intra-prediction and/or inter-prediction operations as may be performed in accordance with video encoding. It is noted that in accordance with intra-prediction, a relatively small amount of storage may be sufficient, in that, it may not be necessary to store the current frame (or picture) or any other frame (or picture) within the frame (or picture) sequence. Such stored information may be employed for performing motion compensation and/or motion estimation in the case of performing inter-prediction in accordance with video encoding.

In one possible embodiment, for motion estimation, a respective set of luma samples (e.g., 16×16) from a current frame (or picture) are compared to respective buffered counterparts in other frames (or pictures) within the frame (or picture) sequence (e.g., in accordance with inter-prediction). In one possible implementation, a closest matching area is located (e.g., prediction reference) and a vector offset (e.g., motion vector) is produced. In a single frame (or picture), a number of motion vectors may be found and not all will necessarily point in the same direction. One or more operations as performed in accordance with motion estimation are operative to generate one or more motion vectors.

Motion compensation is operative to employ one or more motion vectors as may be generated in accordance with motion estimation. A prediction reference set of samples is identified and delivered for subtraction from the original input video signal in an effort hopefully to yield a relatively (e.g., ideally, much) lower energy residual. If such operations do not result in a yielded lower energy residual, motion compensation need not necessarily be performed and the transform operations may merely operate on the original input video signal instead of on a residual (e.g., in accordance with an operational mode in which the input video signal is provided straight through to the transform operation, such that neither intra-prediction nor inter-prediction are performed), or intra-prediction may be utilized and transform operations performed on the residual resulting from intra-prediction. Also, if the motion estimation and/or motion compensation operations are successful, the motion vector may also be sent to the entropy encoder along with the corresponding residual's coefficients for use in undergoing lossless entropy encoding.

The output from the overall video encoding operation is an output bit stream. It is noted that such an output bit stream may of course undergo certain processing in accordance with generating a continuous time signal which may be transmitted via a communication channel. For example, certain embodiments operate within wireless communication systems. In such an instance, an output bitstream may undergo appropriate digital to analog conversion, frequency conversion, scaling, filtering, modulation, symbol mapping, and/or any other operations within a wireless communication device that operate to generate a continuous time signal capable of being transmitted via a communication channel, etc.

Referring to embodiment 500 of FIG. 5, as may be seen with respect to this diagram, an input video signal is received by a video encoder. In certain embodiments, the input video signal is composed of macro-blocks (and/or may be partitioned into coding units (CUs)). The size of such macro-blocks may be varied and can include a number of pixels typically arranged in a square shape. In one embodiment, such macro-blocks have a size of 16×16 pixels. However, it is generally noted that a macro-block may have any desired size such as N×N pixels, where N is an integer. Of course, some implementations may include non-square shaped macro-blocks, although square shaped macro-blocks are employed in a preferred embodiment.

The input video signal may generally be referred to as corresponding to raw frame (or picture) image data. For example, raw frame (or picture) image data may undergo processing to generate luma and chroma samples. In some embodiments, the set of luma samples in a macro-block is of one particular arrangement (e.g., 16×16), and set of the chroma samples is of a different particular arrangement (e.g., 8×8). In accordance with the embodiment depicted herein, a video encoder processes such samples on a block by block basis.

The input video signal then undergoes mode selection by which the input video signal selectively undergoes intra and/or inter-prediction processing. Generally speaking, the input video signal undergoes compression along a compression pathway. When operating with no feedback (e.g., in accordance with neither inter-prediction nor intra-prediction), the input video signal is provided via the compression pathway to undergo transform operations (e.g., in accordance with discrete cosine transform (DCT)). Of course, other transforms may be employed in alternative embodiments. In this mode of operation, the input video signal itself is that which is compressed. The compression pathway may take advantage of the lack of high frequency sensitivity of human eyes in performing the compression.

However, feedback may be employed along the compression pathway by selectively using inter- or intra-prediction video encoding. In accordance with a feedback or predictive mode of operation, the compression pathway operates on a (relatively low energy) residual (e.g., a difference) resulting from subtraction of a predicted value of a current macro-block from the current macro-block. Depending upon which form of prediction is employed in a given instance, a residual or difference between a current macro-block and a predicted value of that macro-block based on at least a portion of that same frame (or picture) or on at least a portion of at least one other frame (or picture) is generated.

The resulting modified video signal then undergoes transform operations along the compression pathway. In one embodiment, a discrete cosine transform (DCT) operates on a set of video samples (e.g., luma, chroma, residual, etc.) to compute respective coefficient values for each of a predetermined number of basis patterns. For example, one embodiment includes 64 basis functions (e.g., such as for an 8×8 sample). Generally speaking, different embodiments may employ different numbers of basis functions (e.g., different transforms). Any combination of those respective basis functions, including appropriate and selective weighting thereof, may be used to represent a given set of video samples. Additional details related to various ways of performing transform operations are described in the technical literature associated with video encoding including those standards/draft standards that have been incorporated by reference as indicated above. The output from the transform processing includes such respective coefficient values. This output is provided to a quantizer.

Generally, most image blocks will typically yield coefficients (e.g., DCT coefficients in an embodiment operating in accordance with discrete cosine transform (DCT)) such that the most relevant DCT coefficients are of lower frequencies. Because of this and of the human eyes' relatively poor sensitivity to high frequency visual effects, a quantizer may be operable to convert most of the less relevant coefficients to a value of zero. That is to say, those coefficients whose relative contribution is below some predetermined value (e.g., some threshold) may be eliminated in accordance with the quantization process. A quantizer may also be operable to convert the significant coefficients into values that can be coded more efficiently than those that result from the transform process. For example, the quantization process may operate by dividing each respective coefficient by an integer value and discarding any remainder. Such a process, when operating on typical macro-blocks, typically yields a relatively low number of non-zero coefficients which are then delivered to an entropy encoder for lossless encoding and for use in accordance with a feedback path which may select intra-prediction and/or inter-prediction processing in accordance with video encoding.

An entropy encoder operates in accordance with a lossless compression encoding process. In comparison, the quantization operations are generally lossy. The entropy encoding process operates on the coefficients provided from the quantization process. Those coefficients may represent various characteristics (e.g., luma, chroma, residual, etc.). Various types of encoding may be employed by an entropy encoder. For example, context-adaptive binary arithmetic coding (CABAC) and/or context-adaptive variable-length coding (CAVLC) may be performed by the entropy encoder. For example, in accordance with at least one part of an entropy coding scheme, the data is converted to a (run, level) pairing (e.g., data 14, 3, 0, 4, 0, 0, −3 would be converted to the respective (run, level) pairs of (0, 14), (0, 3), (1, 4), (2, −3)). In advance, a table may be prepared that assigns variable length codes for value pairs, such that relatively shorter length codes are assigned to relatively common value pairs, and relatively longer length codes are assigned for relatively less common value pairs.

As the reader will understand, the operations of inverse quantization and inverse transform correspond to those of quantization and transform, respectively. For example, in an embodiment in which a DCT is employed within the transform operations, then an inverse DCT (IDCT) is that employed within the inverse transform operations.

An adaptive loop filter (ALF) is implemented to process the output from the inverse transform block. Such an adaptive loop filter (ALF) is applied to the decoded picture before it is stored in a picture buffer (sometimes referred to as a DPB, digital picture buffer). The adaptive loop filter (ALF) is implemented to reduce coding noise of the decoded picture, and the filtering thereof may be selectively applied on a slice by slice basis, respectively, for luminance and chrominance whether or not the adaptive loop filter (ALF) is applied either at slice level or at block level. Two-dimensional 2-D finite impulse response (FIR) filtering may be used in application of the adaptive loop filter (ALF). The coefficients of the filters may be designed slice by slice at the encoder, and such information is then signaled to the decoder (e.g., signaled from a transmitter communication device including a video encoder [alternatively referred to as encoder] to a receiver communication device including a video decoder [alternatively referred to as decoder]).

One embodiment operates by generating the coefficients in accordance with Wiener filtering design. In addition, it may be applied on a block by block based at the encoder whether the filtering is performed and such a decision is then signaled to the decoder (e.g., signaled from a transmitter communication device including a video encoder [alternatively referred to as encoder] to a receiver communication device including a video decoder [alternatively referred to as decoder]) based on quadtree structure, where the block size is decided according to the rate-distortion optimization. It is noted that the implementation of using such 2-D filtering may introduce a degree of complexity in accordance with both encoding and decoding. For example, by using 2-D filtering in accordance and implementation of an adaptive loop filter (ALF), there may be some increasing complexity within encoder implemented within the transmitter communication device as well as within a decoder implemented within a receiver communication device.

The use of an adaptive loop filter (ALF) can provide any of a number of improvements in accordance with such video processing, including an improvement on the objective quality measure by the peak to signal noise ratio (PSNR) that comes from performing random quantization noise removal. In addition, the subjective quality of a subsequently encoded video signal may be achieved from illumination compensation, which may be introduced in accordance with performing offset processing and scaling processing (e.g., in accordance with applying a gain) in accordance with adaptive loop filter (ALF) processing.

Receiving the signal output from the ALF is a picture buffer, alternatively referred to as a digital picture buffer or a DPB; the picture buffer is operative to store the current frame (or picture) and/or one or more other frames (or pictures) such as may be used in accordance with intra-prediction and/or inter-prediction operations as may be performed in accordance with video encoding. It is noted that in accordance with intra-prediction, a relatively small amount of storage may be sufficient, in that, it may not be necessary to store the current frame (or picture) or any other frame (or picture) within the frame (or picture) sequence. Such stored information may be employed for performing motion compensation and/or motion estimation in the case of performing inter-prediction in accordance with video encoding.

In one possible embodiment, for motion estimation, a respective set of luma samples (e.g., 16×16) from a current frame (or picture) are compared to respective buffered counterparts in other frames (or pictures) within the frame (or picture) sequence (e.g., in accordance with inter-prediction). In one possible implementation, a closest matching area is located (e.g., prediction reference) and a vector offset (e.g., motion vector) is produced. In a single frame (or picture), a number of motion vectors may be found and not all will necessarily point in the same direction. One or more operations as performed in accordance with motion estimation are operative to generate one or more motion vectors.

Motion compensation is operative to employ one or more motion vectors as may be generated in accordance with motion estimation. A prediction reference set of samples is identified and delivered for subtraction from the original input video signal in an effort hopefully to yield a relatively (e.g., ideally, much) lower energy residual. If such operations do not result in a yielded lower energy residual, motion compensation need not necessarily be performed and the transform operations may merely operate on the original input video signal instead of on a residual (e.g., in accordance with an operational mode in which the input video signal is provided straight through to the transform operation, such that neither intra-prediction nor inter-prediction are performed), or intra-prediction may be utilized and transform operations performed on the residual resulting from intra-prediction. Also, if the motion estimation and/or motion compensation operations are successful, the motion vector may also be sent to the entropy encoder along with the corresponding residual's coefficients for use in undergoing lossless entropy encoding.

The output from the overall video encoding operation is an output bit stream. It is noted that such an output bit stream may of course undergo certain processing in accordance with generating a continuous time signal which may be transmitted via a communication channel. For example, certain embodiments operate within wireless communication systems. In such an instance, an output bitstream may undergo appropriate digital to analog conversion, frequency conversion, scaling, filtering, modulation, symbol mapping, and/or any other operations within a wireless communication device that operate to generate a continuous time signal capable of being transmitted via a communication channel, etc.

Referring to embodiment 600 of FIG. 6, with respect to this diagram depicting an alternative embodiment of a video encoder, such a video encoder carries out prediction, transform, and encoding processes to produce a compressed output bit stream. Such a video encoder may operate in accordance with and be compliant with one or more video encoding protocols, standards, and/or recommended practices such as ISO/IEC 14496-10-MPEG-4 Part 10, AVC (Advanced Video Coding), alternatively referred to as H.264/MPEG-4 Part 10 or AVC (Advanced Video Coding), ITU H.264/MPEG4-AVC.

It is noted that a corresponding video decoder, such as located within a device at another end of a communication channel, is operative to perform the complementary processes of decoding, inverse transform, and reconstruction to produce a respective decoded video sequence that is (ideally) representative of the input video signal.

As may be seen with respect to this diagram, alternative arrangements and architectures may be employed for effectuating video encoding. Generally speaking, an encoder processes an input video signal (e.g., typically composed in units of macro-blocks, often times being square in shape and including N×N pixels therein). The video encoding determines a prediction of the current macro-block based on previously coded data. That previously coded data may come from the current frame (or picture) itself (e.g., such as in accordance with intra-prediction) or from one or more other frames (or pictures) that have already been coded (e.g., such as in accordance with inter-prediction). The video encoder subtracts the prediction of the current macro-block to form a residual.

Generally speaking, intra-prediction is operative to employ block sizes of one or more particular sizes (e.g., 16×16, 8×8, or 4×4) to predict a current macro-block from surrounding, previously coded pixels within the same frame (or picture). Generally speaking, inter-prediction is operative to employ a range of block sizes (e.g., 16×16 down to 4×4) to predict pixels in the current frame (or picture) from regions that are selected from within one or more previously coded frames (or pictures).

With respect to the transform and quantization operations, a block of residual samples may undergo transformation using a particular transform (e.g., 4×4 or 8×8). One possible embodiment of such a transform operates in accordance with discrete cosine transform (DCT). The transform operation outputs a group of coefficients such that each respective coefficient corresponds to a respective weighting value of one or more basis functions associated with a transform. After undergoing transformation, a block of transform coefficients is quantized (e.g., each respective coefficient may be divided by an integer value and any associated remainder may be discarded, or they may be multiplied by an integer value). The quantization process is generally inherently lossy, and it can reduce the precision of the transform coefficients according to a quantization parameter (QP). Typically, many of the coefficients associated with a given macro-block are zero, and only some nonzero coefficients remain. Generally, a relatively high QP setting is operative to result in a greater proportion of zero-valued coefficients and smaller magnitudes of non-zero coefficients, resulting in relatively high compression (e.g., relatively lower coded bit rate) at the expense of relatively poorly decoded image quality; a relatively low QP setting is operative to allow more nonzero coefficients to remain after quantization and larger magnitudes of non-zero coefficients, resulting in relatively lower compression (e.g., relatively higher coded bit rate) with relatively better decoded image quality.

The video encoding process produces a number of values that are encoded to form the compressed bit stream. Examples of such values include the quantized transform coefficients, information to be employed by a decoder to re-create the appropriate prediction, information regarding the structure of the compressed data and compression tools employed during encoding, information regarding a complete video sequence, etc. Such values and/or parameters (e.g., syntax elements) may undergo encoding within an entropy encoder operating in accordance with CABAC, CAVLC, or some other entropy coding scheme, to produce an output bit stream that may be stored, transmitted (e.g., after undergoing appropriate processing to generate a continuous time signal that comports with a communication channel), etc.

In an embodiment operating using a feedback path, the output of the transform and quantization undergoes inverse quantization and inverse transform. One or both of intra-prediction and inter-prediction may be performed in accordance with video encoding. Also, motion compensation and/or motion estimation may be performed in accordance with such video encoding.

The signal path output from the inverse quantization and inverse transform (e.g., IDCT) block, which is provided to the intra-prediction block, is also provided to a de-blocking filter. The output from the de-blocking filter is provided to an adaptive loop filter (ALF) is implemented to process the output from the inverse transform block. Such an adaptive loop filter (ALF) is applied to the decoded picture before it is stored in a picture buffer (again, sometimes alternatively referred to as a DPB, digital picture buffer). The adaptive loop filter (ALF) is implemented to reduce coding noise of the decoded picture, and the filtering thereof may be selectively applied on a slice by slice basis, respectively, for luminance and chrominance whether or not the adaptive loop filter (ALF) is applied either at slice level or at block level. Two-dimensional 2-D finite impulse response (FIR) filtering may be used in application of the adaptive loop filter (ALF). The coefficients of the filters may be designed slice by slice at the encoder, and such information is then signaled to the decoder (e.g., signaled from a transmitter communication device including a video encoder [alternatively referred to as encoder] to a receiver communication device including a video decoder [alternatively referred to as decoder]).

One embodiment generated the coefficients in accordance with Wiener filtering design. In addition, it may be applied on a block by block based at the encoder whether the filtering is performed and such a decision is then signaled to the decoder (e.g., signaled from a transmitter communication device including a video encoder [alternatively referred to as encoder] to a receiver communication device including a video decoder [alternatively referred to as decoder]) based on quadtree structure, where the block size is decided according to the rate-distortion optimization. It is noted that the implementation of using such 2-D filtering may introduce a degree of complexity in accordance with both encoding and decoding. For example, by using 2-D filtering in accordance and implementation of an adaptive loop filter (ALF), there may be some increasing complexity within encoder implemented within the transmitter communication device as well as within a decoder implemented within a receiver communication device.

As mentioned with respect to other embodiments, the use of an adaptive loop filter (ALF) can provide any of a number of improvements in accordance with such video processing, including an improvement on the objective quality measure by the peak to signal noise ratio (PSNR) that comes from performing random quantization noise removal. In addition, the subjective quality of a subsequently encoded video signal may be achieved from illumination compensation, which may be introduced in accordance with performing offset processing and scaling processing (e.g., in accordance with applying a gain) in accordance with adaptive loop filter (ALF) processing.

With respect to any video encoder architecture implemented to generate an output bitstream, it is noted that such architectures may be implemented within any of a variety of communication devices. The output bitstream may undergo additional processing including error correction code (ECC), forward error correction (FEC), etc. thereby generating a modified output bitstream having additional redundancy deal therein. Also, as may be understood with respect to such a digital signal, it may undergo any appropriate processing in accordance with generating a continuous time signal suitable for or appropriate for transmission via a communication channel. That is to say, such a video encoder architecture may be of limited within a communication device operative to perform transmission of one or more signals via one or more communication channels. Additional processing may be made on an output bitstream generated by such a video encoder architecture thereby generating a continuous time signal that may be launched into a communication channel.

FIG. 7 is a diagram illustrating an embodiment 700 of intra-prediction processing. As can be seen with respect to this diagram, a current block of video data (e.g., often times being square in shape and including generally N×N pixels) undergoes processing to estimate the respective pixels therein. Previously coded pixels located above and to the left of the current block are employed in accordance with such intra-prediction. From certain perspectives, an intra-prediction direction may be viewed as corresponding to a vector extending from a current pixel to a reference pixel located above or to the left of the current pixel. Details of intra-prediction as applied to coding in accordance with H.264/AVC are specified within the corresponding standard (e.g., International Telecommunication Union, ITU-T, TELE-COMMUNICATION STANDARDIZATION SECTOR OF ITU, H.264 (03/2010), SERIES H: AUDIOVISUAL AND MULTIMEDIA SYSTEMS, Infrastructure of audiovisual services-Coding of moving video, Advanced video coding for generic audiovisual services, Recommendation ITU-T H.264, also alternatively referred to as International Telecomm ISO/IEC 14496-10-MPEG-4 Part 10, AVC (Advanced Video Coding), H.264/MPEG-4 Part 10 or AVC (Advanced Video Coding), ITU H.264/MPEG4-AVC, or equivalent) that is incorporated by reference above.

The residual, which is the difference between the current pixel and the reference or prediction pixel, is that which gets encoded. As can be seen with respect to this diagram, intra-prediction operates using pixels within a common frame (or picture). It is of course noted that a given pixel may have different respective components associated therewith, and there may be different respective sets of samples for each respective component.

Figure 8:
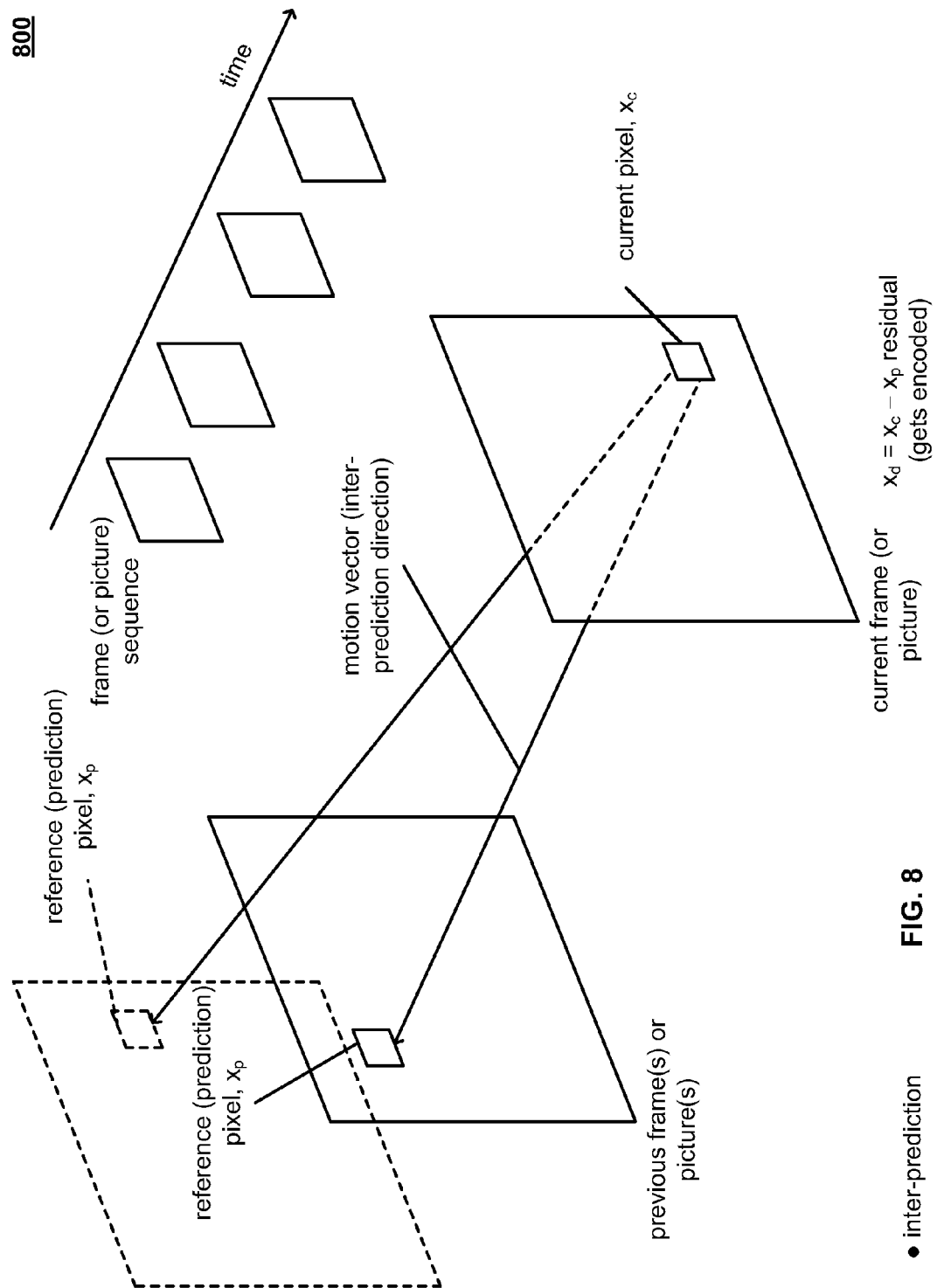
FIG. 8 is a diagram illustrating an embodiment of inter-prediction processing.

FIG. 8 is a diagram illustrating an embodiment 800 of inter-prediction processing. In contradistinction to intra-prediction processing, inter-prediction is operative to identify a motion vector (e.g., an inter-prediction direction) based on a current set of pixels within a current frame (or picture) and one or more sets of reference or prediction pixels located within one or more other frames (or pictures) within a frame (or picture) sequence. As can be seen, the motion vector extends from the current frame (or picture) to another frame (or picture) within the frame (or picture) sequence. Inter-prediction may utilize sub-pixel interpolation, such that a prediction pixel value corresponds to a function of a plurality of pixels in a reference frame or picture.

A residual may be calculated in accordance with inter-prediction processing, though such a residual is different from the residual calculated in accordance with intra-prediction processing. In accordance with inter-prediction processing, the residual at each pixel again corresponds to the difference between a current pixel and a predicted pixel value. However, in accordance with inter-prediction processing, the current pixel and the reference or prediction pixel are not located within the same frame (or picture). While this diagram shows inter-prediction as being employed with respect to one or more previous frames or pictures, it is also noted that alternative embodiments may operate using references corresponding to frames before and/or after a current frame. For example, in accordance with appropriate buffering and/or memory management, a number of frames may be stored. When operating on a given frame, references may be generated from other frames that precede and/or follow that given frame.

Coupled with the CU, a basic unit may be employed for the prediction partition mode, namely, the prediction unit, or PU. It is also noted that the PU is defined only for the last depth CU, and its respective size is limited to that of the CU.

Figure 9:
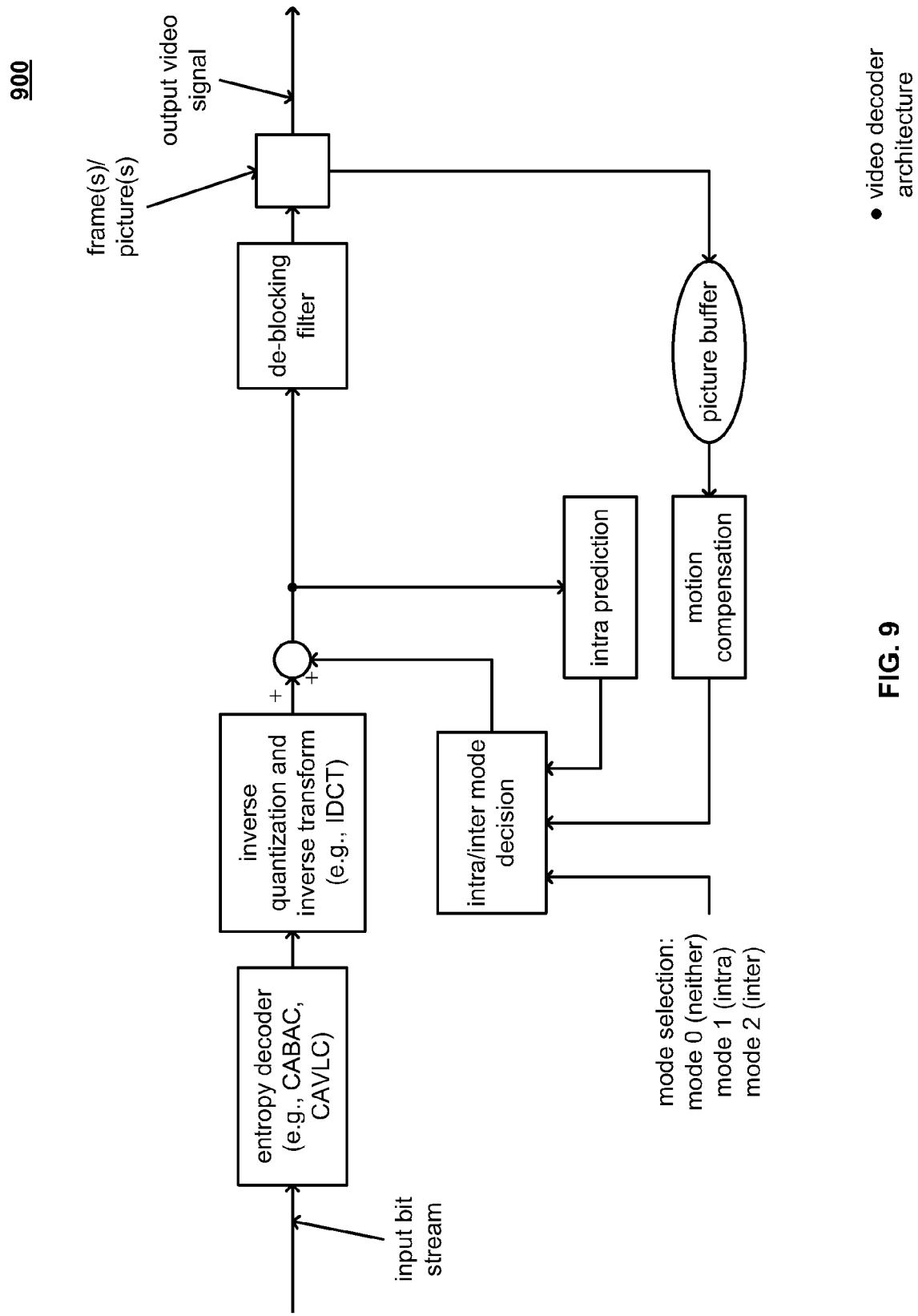
FIG. 9 and FIG. 10 are diagrams illustrating various embodiments of video decoding architectures.
Figure 10:
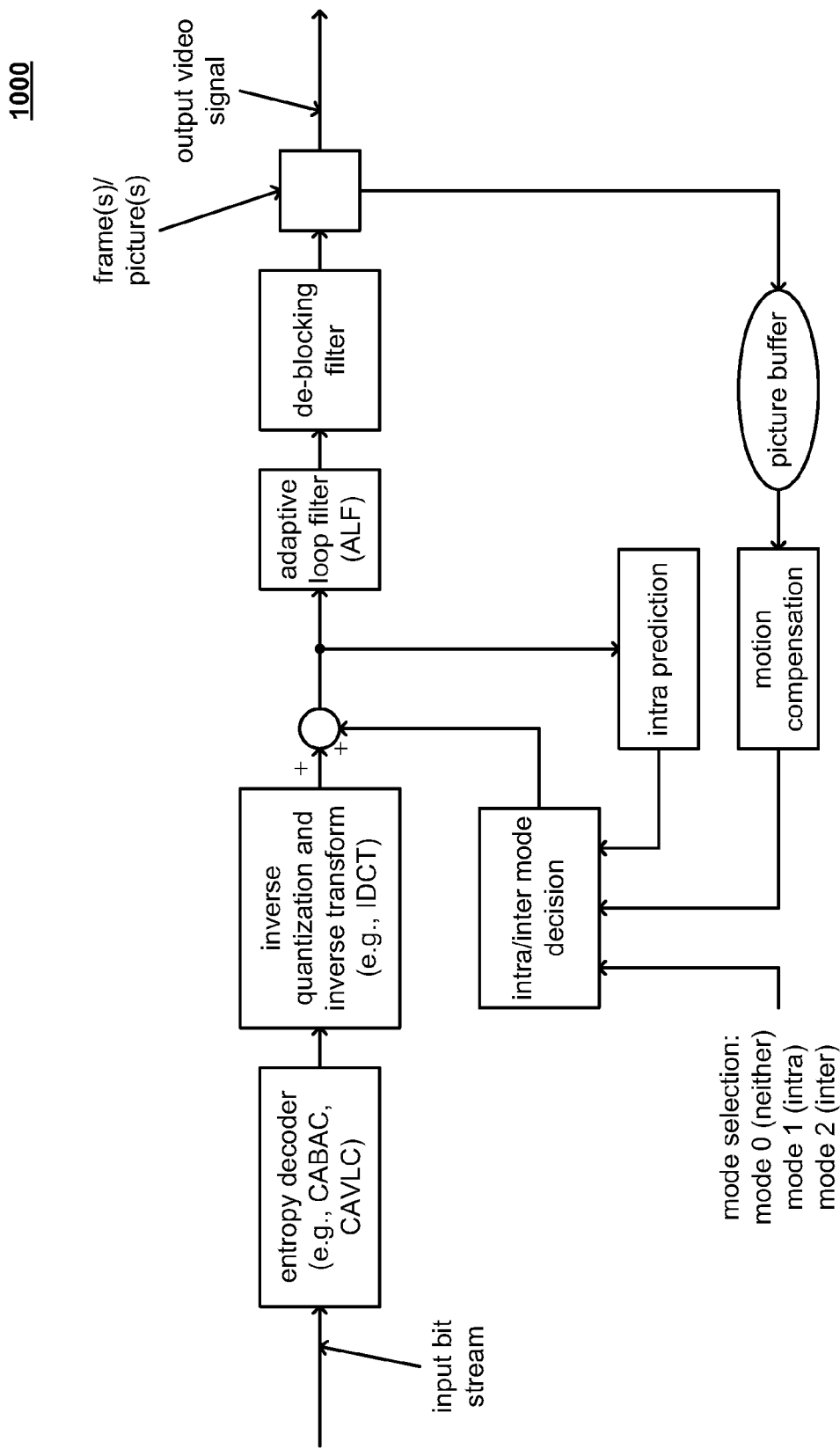

FIG. 9 and FIG. 10 are diagrams illustrating various embodiments 900 and 1000, respectively, of video decoding architectures.

Generally speaking, such video decoding architectures operate on an input bitstream. It is of course noted that such an input bitstream may be generated from a signal that is received by a communication device from a communication channel. Various operations may be performed on a continuous time signal received from the communication channel, including digital sampling, demodulation, scaling, filtering, etc. such as may be appropriate in accordance with generating the input bitstream. Moreover, certain embodiments, in which one or more types of error correction code (ECC), forward error correction (FEC), etc. may be implemented, may perform appropriate decoding in accordance with such ECC, FEC, etc. thereby generating the input bitstream. That is to say, in certain embodiments in which additional redundancy may have been made in accordance with generating a corresponding output bitstream (e.g., such as may be launched from a transmitter communication device or from the transmitter portion of a transceiver communication device), appropriate processing may be performed in accordance with generating the input bitstream. Overall, such a video decoding architectures and lamented to process the input bitstream thereby generating an output video signal corresponding to the original input video signal, as closely as possible and perfectly in an ideal case, for use in being output to one or more video display capable devices.

Referring to the embodiment 900 of FIG. 9, generally speaking, a decoder such as an entropy decoder (e.g., which may be implemented in accordance with CABAC, CAVLC, etc.) processes the input bitstream in accordance with performing the complementary process of encoding as performed within a video encoder architecture. The input bitstream may be viewed as being, as closely as possible and perfectly in an ideal case, the compressed output bitstream generated by a video encoder architecture. Of course, in a real-life application, it is possible that some errors may have been incurred in a signal transmitted via one or more communication links. The entropy decoder processes the input bitstream and extracts the appropriate coefficients, such as the DCT coefficients (e.g., such as representing chroma, luma, etc. information) and provides such coefficients to an inverse quantization and inverse transform block. In the event that a DCT transform is employed, the inverse quantization and inverse transform block may be implemented to perform an inverse DCT (IDCT) operation. Subsequently, A/D blocking filter is implemented to generate the respective frames and/or pictures corresponding to an output video signal. These frames and/or pictures may be provided into a picture buffer, or a digital picture buffer (DPB) for use in performing other operations including motion compensation. Generally speaking, such motion compensation operations may be viewed as corresponding to inter-prediction associated with video encoding. Also, intra-prediction may also be performed on the signal output from the inverse quantization and inverse transform block. Analogously as with respect to video encoding, such a video decoder architecture may be implemented to perform mode selection between performing it neither intra-prediction nor inter-prediction, inter-prediction, or intra-prediction in accordance with decoding an input bitstream thereby generating an output video signal.

Referring to the embodiment 1000 of FIG. 10, in those embodiments in which an adaptive loop filter (ALF) may be implemented in accordance with video encoding as employed to generate an output bitstream, a corresponding adaptive loop filter (ALF) may be implemented within a video decoder architecture. In one embodiment, an appropriate implementation of such an ALF is before the de-blocking filter.

Figure 11:
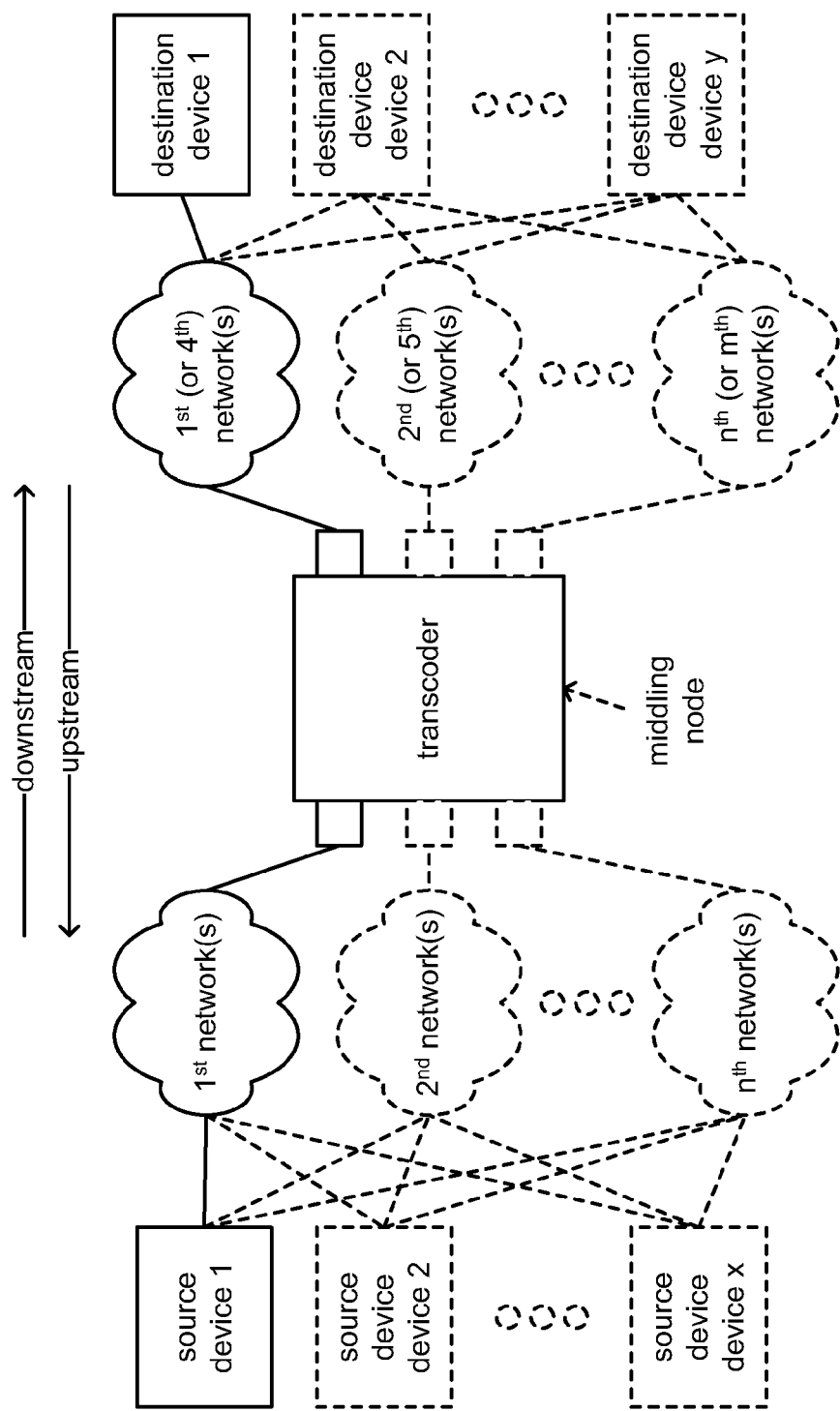
FIG. 11 illustrates an embodiment of a transcoder implemented within a communication system.

FIG. 11 illustrates an embodiment 1100 of a transcoder implemented within a communication system. As may be seen with respect to this diagram, a transcoder may be implemented within a communication system composed of one or more networks, one or more source devices, and/or one or more destination devices. Generally speaking, such a transcoder may be viewed as being a middling device interveningly implemented between at least one source device and at least one destination device as connected and/or coupled via one or more communication links, networks, etc. In certain situations, such a transcoder may be implemented to include multiple inputs and/or multiple outputs for receiving and/or transmitting different respective signals from and/or to one or more other devices.

Operation of any one or more modules, circuitries, processes, steps, etc. within the transcoder may be adaptively made based upon consideration associated with local operational parameters and/or remote operational parameters. Examples of local operational parameters may be viewed as corresponding to provision and/or currently available hardware, processing resources, memory, etc. Examples of remote operational parameters may be viewed as corresponding to characteristics associated with respective streaming media flows, including delivery flows and/or source flows, corresponding to signaling which is received from and/or transmitted to one or more other devices, including source devices and or destination devices. For example, characteristics associated with any media flow may be related to any one or more of latency, delay, noise, distortion, crosstalk, attenuation, signal to noise ratio (SNR), capacity, bandwidth, frequency spectrum, bit rate, symbol rate associated with the at least one streaming media source flow, and/or any other characteristic, etc. Considering another example, characteristics associated with any media flow may be related more particularly to a given device from which or through which such a media flow may pass including any one or more of user usage information, processing history, queuing, an energy constraint, a display size, a display resolution, a display history associated with the device, and/or any other characteristic, etc. Moreover, various signaling may be provided between respective devices in addition to signaling of media flows. That is to say, various feedback or control signals may be provided between respective devices within such a communication system.

In at least one embodiment, such a transcoder is implemented for selectively transcoding at least one streaming media source flow thereby generating at least one transcoded streaming media delivery flow based upon one or more characteristics associated with the at least one streaming media source flow and/or the at least one transcoder that streaming media delivery flow. That is to say, consideration may be performed by considering characteristics associated with flows with respect to an upstream perspective, a downstream perspective, and/or both an upstream and downstream perspective. Based upon these characteristics, including historical information related thereto, current information related thereto, and/or predicted future information related thereto, adaptation of the respective transcoding as performed within the transcoder may be made. Again, consideration may also be made with respect to global operating conditions and/or the current status of operations being performed within the transcoder itself. That is to say, consideration with respect to local operating conditions (e.g., available processing resources, available memory, source flow(s) being received, delivery flow(s) being transmitted, etc.) may also be used to effectuate adaptation of respective transcoding as performed within the transcoder.

In certain embodiments, adaptation is performed by selecting one particular video coding protocol or standard from among a number of available video coding protocols or standards. If desired, such adaptation may be with respect to selecting one particular profile of a given video coding protocol or standard from among a number of available profiles corresponding to one or more video coding protocols or standards. Alternatively, such adaptation may be made with respect to modifying one or more operational parameters associated with a video coding protocol or standard, a profile thereof, or a subset of operational parameters associated with the video coding protocol or standard.

In other embodiments, adaptation is performed by selecting different respective manners by which video coding may be performed. That is to say, certain video coding, particularly operative in accordance with entropy coding, maybe context adaptive, non-context adaptive, operative in accordance with syntax, or operative in accordance with no syntax. Adaptive selection between such operational modes, specifically between context adaptive and non-context adaptive, and with or without syntax, may be made based upon such considerations as described herein.

Generally speaking, a real time transcoding environment may be implemented wherein scalable video coding (SVC) operates both upstream and downstream of the transcoder and wherein the transcoder acts to coordinate upstream SVC with downstream SVC. Such coordination involves both internal sharing real time awareness of activities wholly within each of the transcoding decoder and transcoding encoder. This awareness extends to external knowledge gleaned by the transcoding encoder and decoder when evaluating their respective communication PHY/channel performance. Further, such awareness exchange extends to actual feedback received from a downstream media presentation device' decoder and PHY, as well as an upstream media source encoder and PHY fully to carry out SVC plus overall flow management, control signaling via industry or proprietary standard channels flow between all three nodes.

Figure 12:
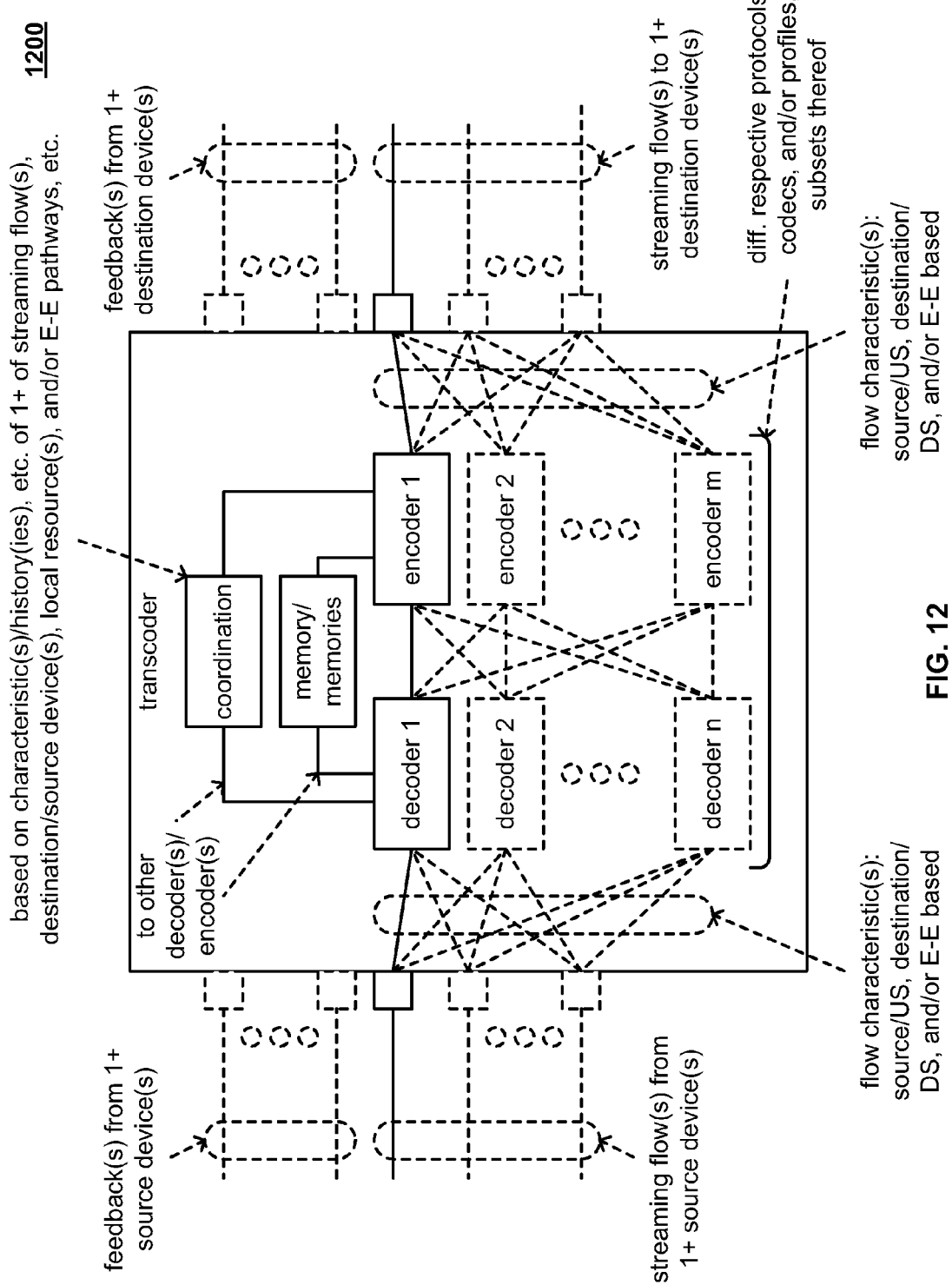
FIG. 12 illustrates an alternative embodiment of a transcoder implemented within a communication system.

FIG. 12 illustrates an alternative embodiment 1200 of a transcoder implemented within a communication system. As can be seen with respect to this diagram, one or more respective decoders and one or more respective and coders may be provisioned each having access to one or more memories and each operating in accordance with coordination based upon any of the various considerations and/or characteristics described herein. For example, characteristics associated with respective streaming flows from one or more source devices, to one or more destination devices, the respective end-to-end pathways between any given source device and any given destination device, feedback and/or control signaling from those source devices/destination devices, local operating considerations, histories, etc. may be used to effectuate adaptive operation of decoding processing and/or encoding processing in accordance with transcoding.

Figure 13:
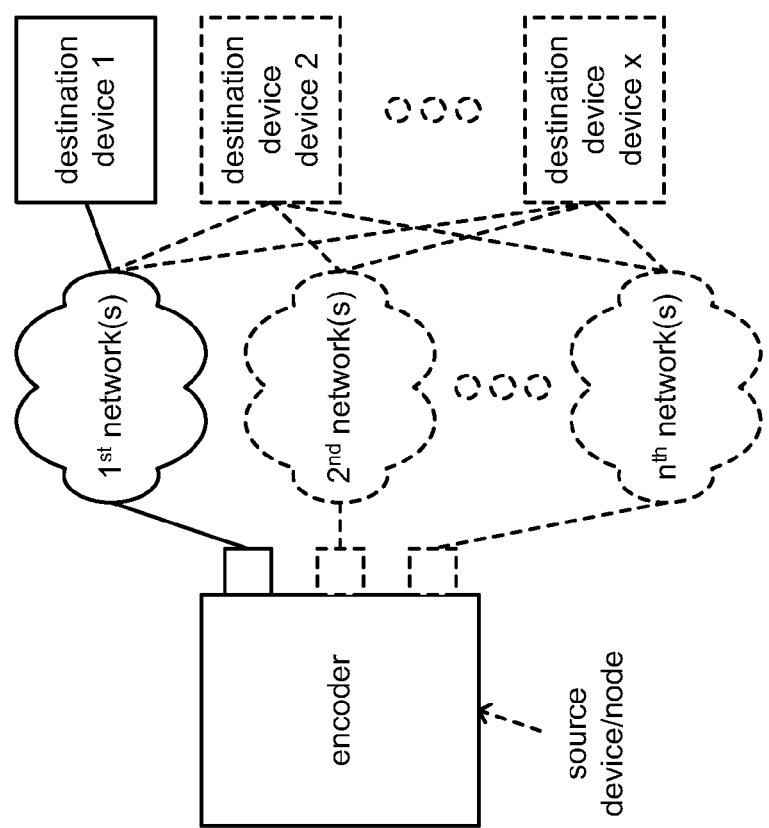
FIG. 13 illustrates an embodiment of an encoder implemented within a communication system.

FIG. 13 illustrates an embodiment 1300 of an encoder implemented within a communication system. As may be seen with respect to this diagram, and encoder may be implemented to generate one or more signals that may be delivered via one or more delivery flows to one or more destination devices via one or more communication networks, links, etc.

As may be analogously understood with respect to the context of transcoding, the corresponding encoding operations performed therein may be applied to a device that does not necessarily performed decoding of received streaming source flows, but is operative to generate streaming delivery flows that may be delivered via one or more delivery flows to one or more destination devices via one or more communication networks, links, etc.

Figure 14:
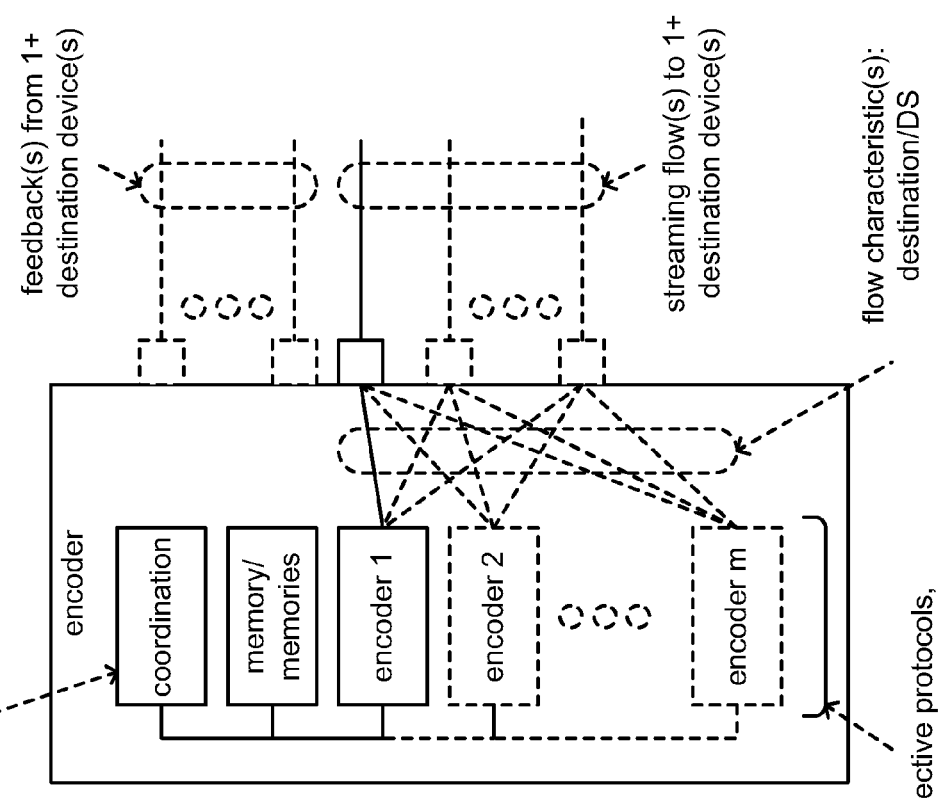
FIG. 14 illustrates an alternative embodiment of an encoder implemented within a communication system.

FIG. 14 illustrates an alternative embodiment 1400 of an encoder implemented within a communication system. As may be seen with respect to this diagram, coordination and adaptation among different respective and coders may be analogously performed within a device implemented for performing encoding as is described elsewhere herein with respect to other diagrams and/or embodiments operative to perform transcoding. That is to say, with respect to an implementation such as depicted within this diagram, adaptation may be effectuated based upon encoding processing and the selection of one encoding over a number of encodings in accordance with any of the characteristics, considerations, whether they be local and/or remote, etc.

Figure 15:
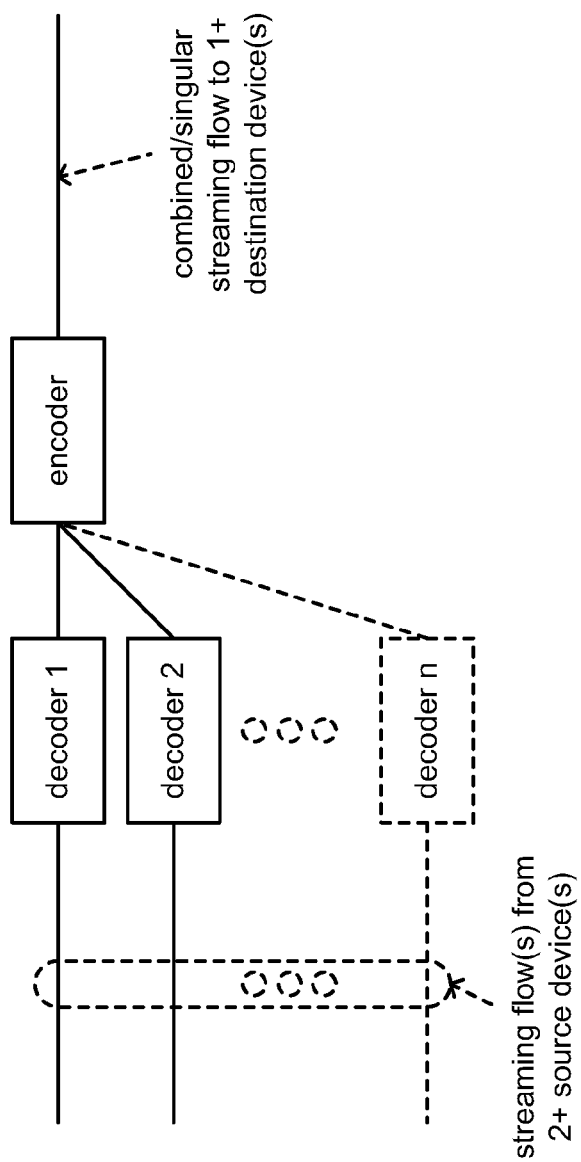
FIG. 15 and FIG. 16 illustrate various embodiments of transcoding.
Figure 16:
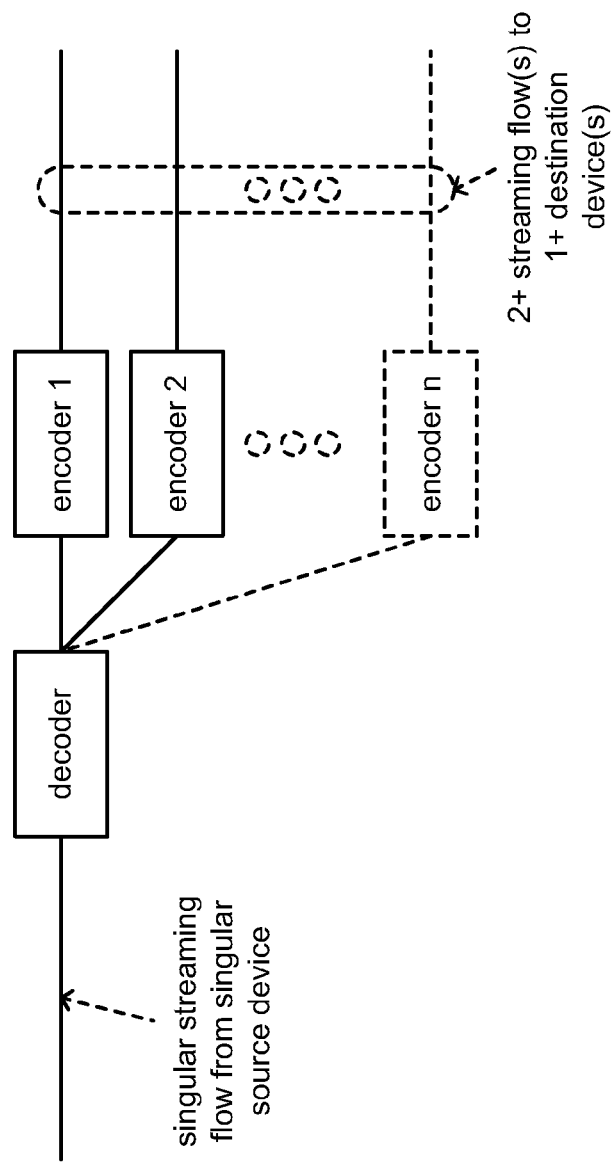

FIG. 15 and FIG. 16 illustrate various embodiments 1500 and 1600, respectively, of transcoding.

Referring to the embodiment 1500 of FIG. 15, this diagram shows two or more streaming source flows being provided from two or more source devices, respectively. At least two respective decoders are implemented to perform decoding of these streaming source flows simultaneously, in parallel, etc. with respect to each other. The respective decoded outputs generated from those two or more streaming source flows are provided to a singular encoder. The encoder is implemented to generate a combined/singular streaming flow from the two or more respective decoded outputs. This combined/singular streaming flow may be provided to one or more destination devices. As can be seen with respect to this diagram, a combined/singular streaming flow may be generated from more than one streaming source flows from more than one source devices.

Alternatively, there may be some instances in which the two or more streaming source flows may be provided from a singular source device. That is to say, a given video input signal may undergo encoding in accordance with two or more different respective video encoding operational modes thereby generating different respective streaming source flows both commonly generated from the same original input video signal. In some instances, one of the streaming source flows may be provided via a first communication pathway, and another of the streaming source flows may be provided via a second communication pathway. Alternatively, these different respective streaming source flows may be provided via a common communication pathway. There may be instances in which one particular streaming source flow may be more deleteriously affected during transmission than another streaming source flow. That is to say, depending upon the particular manner and coding by which a given streaming source flow has been generated, it may be more susceptible or more resilient to certain deleterious effects (e.g. noise, interference, etc.) during respective transmission via a given communication pathway. In certain embodiments, if sufficient resources are available, it may be desirable not only to generate different respective streaming flows that are provided via different respective communication pathways.

Referring to the embodiment 1600 of FIG. 16, this diagram shows a single streaming source flow provided from a singular source device. A decoder is operative to decode the single streaming source flow thereby generating at least one decoded signal that is provided to at least two respective encoders implemented for generating at least two respective streaming delivery flows that may be provided to one or more destination devices. As can be seen with respect to this diagram, a given received streaming source flow may undergo transcoding in accordance with at least two different operational modes. For example, this diagram illustrates that at least two different respective encoders may be implemented for generating two or more different respective streaming delivery flows that may be provided to one or more destination devices.

FIG. 17 illustrates an embodiment 1700 of various encoders and/or decoders that may be implemented within any of a number of types of communication devices. As described with respect to other embodiments and/or diagrams herein, different respective video coding standards or protocols may have different respective characteristics.

From certain perspectives, operation is performed such that automatic (or semiautomatic) selection and reselection among various video coding standards or protocols may be made midstream. Such adaptation and selectivity may be made in the event that the conditions warrant and with reference frame sync and buffer sufficiency from amongst all of the available coding standards along with all the available profiles there within. Also, such initial and adaptive selection may be implemented to take advantage of the underlying benefits of one standard's profile over others for a given infrastructure's present capabilities and conditions.

For example, because of processing power limitations, connection characteristics, age, and/or any other characteristics as described herein, etc., a handheld client device might only support three types of decoding, while a streaming source might support only two of such standards and possibly others not supported by the client device. If a selection is made to use one of the matching standards for any of a variety of reasons (e.g., channel characteristics, node loading, channel loading, current pathway, error conditions, SNR, etc.) and such conditions change, a different coding standard can be made along with different profile selections.

For example, the H.264 video coding standard, as referenced above and also incorporated by reference herein, may generally be viewed as being context adaptive and not operating in accordance with syntax. Video coding in accordance with VP8 may generally be viewed as being not context adaptive but operating in accordance with syntax. While these two video coding approaches are exemplary, a number of different video codecs may be employed that have different degrees of context adaptive characteristics and operating with or without syntax. That is to say, adaptive functionality and selectivity as described with respect to any desired embodiments and/or diagrams herein may be implemented, in one particular embodiment, as mixing and matching between a number of different codecs having different degrees of context adaptability and operating with or without syntax. For example, based upon any of the various considerations described herein, including local considerations, characteristics, etc. and/or remote considerations, characteristics, etc., and appropriately selected codec may be used for effectuating video encoding and/or decoding.

For example, considering one particular implementation, if the local resources of a given device have sufficiently provisioned resources, hardware, memory, etc., and the communication network, link, etc. by which a given signal is to be transmitted is capable of providing an acceptable amount of throughput with acceptably low errors, latency, etc., then a codec that is context adaptive and operative without syntax may be appropriately selected. For example, a codec corresponding more closely to H.264 may be appropriately selected in such a situation in which the likelihood of losing synchronization is negligible or sufficiently/acceptably low. Alternatively, if it is known with a reasonable degree of certainty that a stream or signal may in fact be lost during transmission, and synchronization loss is almost certain, then a codec corresponding more closely to VP8 may be appropriately selected.

Generally speaking, however, these exemplary video encoding approaches (e.g., H.264 and VP8) are but two examples of a spectrum of different codecs that may have different degrees of context adaptability and operating with or without syntax. For example, depending upon a given situation, it may be more desirable to employ a codec that operates in accordance with context adaptation and without syntax. In another situation, it may be more desirable to employ a codec that operates without context adaptation yet does operate in accordance with syntax. In even other situations, it may be more desirable to employ a codec that operates with context adaptation and with syntax. Also, certain situations may lend themselves to employing a codec that operates without context adaptation and without syntax.

It is also noted that, analogous to operation in accordance with other embodiments and/or diagrams, an initial selection may be made with respect to a given codec. This initial selection may be predetermined and/or based upon current conditions (e.g., including those which may be local and or remote based). Based upon a change of any one of such conditions, an alternative codec may be selected for subsequent use.

Also, it is noted that such codecs as described with respect to such an embodiment may correspond particularly to entropy codecs. That is to say, a number of different entropy coders may be implemented such that some of them operate with syntax and some operate without syntax. Also, some of those entropy coders may have different degrees of context adaptability. Again, operation may begin in accordance with a first selected codec, and subsequent operation may then be made such that another one or more codecs may be adaptively selected for subsequent use. Of course, there may be situations in which subsequent operation using a subsequently selected codec may correspond to the originally selected codec. That is to say, a subsequently selected codec may correspond to that originally/initially selected codec in certain situations.

Generally speaking, such adaptation as may be performed between different codecs, including between different respective decoders and/or and coders, may be made in real time or on the fly. Such adaptation and selectivity between non-context adaptive, context adaptive, syntax based or non-syntax based entropy coding may be made to meet the respective needs of an end to end (E-E) consumption pathway between a source device and a destination device.

Transitioning between the respective end to end (E-E) configurations in midstream may be effectuated based upon reference transitions within appropriate header information leadoff in a given bitstream. For example, an encoder or transcoder may be operative to make a decision regarding transition independently or via direction or coordination with a decoding device and/or any other device, node, etc. from which control or such signaling information is provided.

For example, parallelism considerations may require that, under a current situation, syntax usage may be more appropriate or desirable. In addition, certain local considerations (e.g., processing resources, energy/power capabilities, etc.) may affect a decision to support parallelism and consequently direct a decision to employ a syntax based codec. Analogously, such local considerations may be made with respect to a destination device (e.g., that includes a decoder) regarding whether or not to employ a syntax based codec or not.

For example, parallel as of considerations may require that, under a current situation, syntax usage may be more appropriate or desirable. In addition, certain local considerations (e.g., processing resources, energy/power capabilities, etc.) may affect a decision to support parallelism and consequently direct a decision to employ a syntax based codec. Analogously, such local considerations may be made with respect to a destination device (e.g., that includes a decoder) regarding whether or not to employ a syntax based codec or not.

With respect to this embodiment and diagram as well as others described herein, it is noted that set up of such operation can be manually performed, performed automatically, or performed semi-automatically in which an assessment of any one or more portions of an entire pathway between a media source device and a media destination device (e.g., sometimes including every respective node and every respective communication link there between [possibly also including respective air characteristics, delays, etc.], including those corresponding to respective middling nodes/devices [possibly also including respective local considerations of those middling nodes/devices], etc., as well as possibly including the respective present media content demands or requests of a destination device, etc.) may be considered.

In addition, it is also noted that such adaptation may be directed towards adapting from a relatively more complex end to end (E-E) configuration to a relatively less complex and when configuration. It is also noted that there may be such situations in which there is not perfect correlation between those respective codecs supported by an encoding device and those respective codec supported by a decoding device. Consideration of the relative capabilities and/or capability sets may be made in accordance with both the initial setup of which particular codecs to be supported and employed as well as subsequent adaptation based thereon.

FIG. 18A, FIG. 18B, FIG. 19A, FIG. 19B, FIG. 20A, FIG. 20B, FIG. 21A, and FIG. 21B illustrate various embodiment of methods as may be performed by one or more communication devices.

Referring to the method 1800 of FIG. 18A, the method 1800 operates by receiving at least one streaming media source flow, as shown in a block 1810. The method 1800 also operates by outputting at least one streaming media delivery flow, as shown in a block 1820. In some embodiments, the operations of the blocks 1810 and 1820 may be performed successively, in that the operations of the block 1810 are performed before the operations of the block 1820. In other embodiments, the operations of the blocks 1810 and 1820 may be performed simultaneously, in parallel with one another, etc., in that, at least one streaming media source flow may be received during the same time or at the same time that at least one streaming media delivery flow is output. As may be understood, the method 1800 may be viewed, from certain perspectives, as being performed within a middling node, such as a transcoding node. For example, within a communication device including a number of different devices implemented at any of a number of different nodes, such a middling node, or transcoding node, may be implemented to receive signals from one or more devices implemented upstream and maybe implemented to transmit signals to one or more devices of limited downstream.

The method 1800 also operates by identifying at least one characteristic associated with the at least one streaming media source flow and/or the at least one streaming media delivery flow, as shown in a block 1830. Such characteristics may be associated with respective communication links, communication networks, etc. and/or associated with different respective devices, including source devices and/or destination devices, with which such a middling node, or transcoding node, may be connected to and/or in communication with via one or more communication networks, links, etc.

For example, in certain embodiments in from certain perspectives, any such characteristics may be associated with one or more of latency, delay, noise, distortion, crosstalk, attenuation, signal to noise ratio (SNR), capacity, bandwidth, frequency spectrum, bit rate, and/or symbol rate associated with the at least one streaming media flows (e.g., source flow, delivery flow, etc.). Alternatively, in certain other embodiments and from certain other perspectives, any such characteristics may be associated with one or more of user usage information, processing history, queuing, an energy constraint, a display size, a display resolution, and/or a display history associated with the at least one device (e.g., source device, delivery device, etc.). That is to say, such characteristics may be associated with respective communication links, networks, etc. and/or devices implemented within one or more networks, etc.

The method 1800 also operates by selectively transcoding the at least one streaming media source flow thereby generating at least one transcoded streaming media delivery flow based on the identified at least one characteristic, as shown in a block 1840. The method 1800 is also operative for outputting the transcoded at least one transcoded streaming media delivery flow, as shown in a block 1850. As may be understood, such an outputted signal may be viewed as being provided to any one or more destination devices via any one or more communication links, networks, etc.

Referring to the method 1801 of FIG. 18B, the method 1801 operates by identifying at least one upstream characteristic associated with an upstream communication link and/or at least one communication device implemented upstream, as shown in a block 1811. The method 1801 also operates by identifying at least one downstream characteristic associated with a downstream communication link and/or at least one communication device implement a downstream, as shown in a block 1821. With respect to the upstream and/or downstream communication links, it is noted that such communication links need not necessarily be from a middling node, or a transcoding node, and a source device or a destination device. For example, such upstream and/or downstream communication links may be between two respective devices both implemented and located remotely with respect to such a middling node, or a transcoding node. That is to say, consideration may be made with respect to different respective communication links and/or pathways that are remotely located with respect to a given middling node, or a transcoding node. Even in such instances, such a middling node, or a transcoding node, may be implemented to consider characteristics associated with different respective communication links throughout a relatively large vicinity or even throughout all of a communication network with which the middling node, or transcoding node, is connected to and/or operatively in communication with.

The method 1801 also operates by selectively processing at least one streaming media signal based on the at least one upstream characteristic and/or the at least one downstream characteristic, as shown in a block 1831. For example, such a streaming media signal may be received by a middling node, or transcoding node, or from a source device. Alternatively, such a media signal may be locally residence and available within such a middling node, or transcoding node. Generally speaking, such consideration in regards to processing (e.g., encoding, transcoding, etc.) may be made in accordance with consideration of one or more characteristics associated upstream and/or one or more characteristics associated downstream. In some embodiments, consideration is specifically provided with respect to both at least one upstream characteristic and at least one downstream characteristic. The method 1801 then operates by outputting the process at least one streaming media signal, as shown in a block 1841. As may be understood, such an outputted signal may be viewed as being provided to any one or more destination devices via any one or more communication links, networks, etc.

Referring to the method 1900 of FIG. 19A, the method 1900 operates by receiving a first feedback or control signal from at least one communication device implemented upstream, as shown in a block 1910. The method 1900 also operates by receiving a second feedback or control signal from at least one communication device of limited downstream, as shown in a block 1920. The operations of the blocks 1910 and 1920 may be performed simultaneously, in parallel, etc. or at different times, successively, serially, etc.

The method 1900 operates by selectively processing at least one streaming media signal based on the first feedback or control signal and/or the second feedback or control signal, as shown in a block 1930. For example, such a streaming media signal may be received by a middling node, or transcoding node, or from a source device. Alternatively, such a media signal may be locally residence and available within such a middling node, or transcoding node. Generally speaking, such consideration in regards to processing (e.g., encoding, transcoding, etc.) may be made in accordance with consideration of one or more characteristics associated upstream and/or one or more characteristics associated downstream.

In some embodiments, the selective processing is performed in the block 1930 is performed in accordance with consideration of feedback or control signals provided from both upstream and downstream directions, such as with reference to a middling node, or transcoding node, implementation. The method 1900 also operates by outputting the process at least one streaming media signal, as shown in a block 1940. As may be understood, such an outputted signal may be viewed as being provided to any one or more destination devices via any one or more communication links, networks, etc.

Referring to the method 1901 of FIG. 19B, the method 1901 operates by receiving at least a first feedback or control signal from at least one communication device implemented upstream or downstream, as shown in a block 1911. The method 1901 also operates by transmitting at least a second feedback or control signal to the at least one communication device or at least one additional communication device implemented upstream or downstream, as shown in a block 1921. As may be understood, different respective feedback or control signals may be received by and/or transmitted from a given communication device. For example, such a communication device may be implemented as a middling node, or transcoding node, within a given communication system including one or more communication links, one or more communication networks, etc.

The method 1901 also operates by receiving at least a third feedback or control signal from the at least one communication device or the at least one additional communication device implemented upstream or downstream, as shown in a block 1931. With respect to operation of the method 1901, it may be seen that different respective feedback or control signals may also be received based upon one or more prior transmitted or received feedback or control signals. That is to say, different respective devices implement within such a communication system may be interacted with one another such that information such as feedback or control signals is provided there between, processed, updated, etc. and one or more additional feedback or control signals are provided there between. In some embodiments, the operations of the block 1931 may be viewed as being specifically in response to operations of the block 1921.

The method 1901 also operates by selectively processing at least one streaming media signal based on at least one of the at least a first feedback or control signal and/or the at least a third feedback or control signal, as shown in a block 1941. The method 1901 also operates by outputting the processed at least one streaming media signal, as shown in a block 1951. For example, such an outputted signal may be viewed as being provided to any one or more destination devices via any one or more communication links, networks, etc.

Figure 20B:
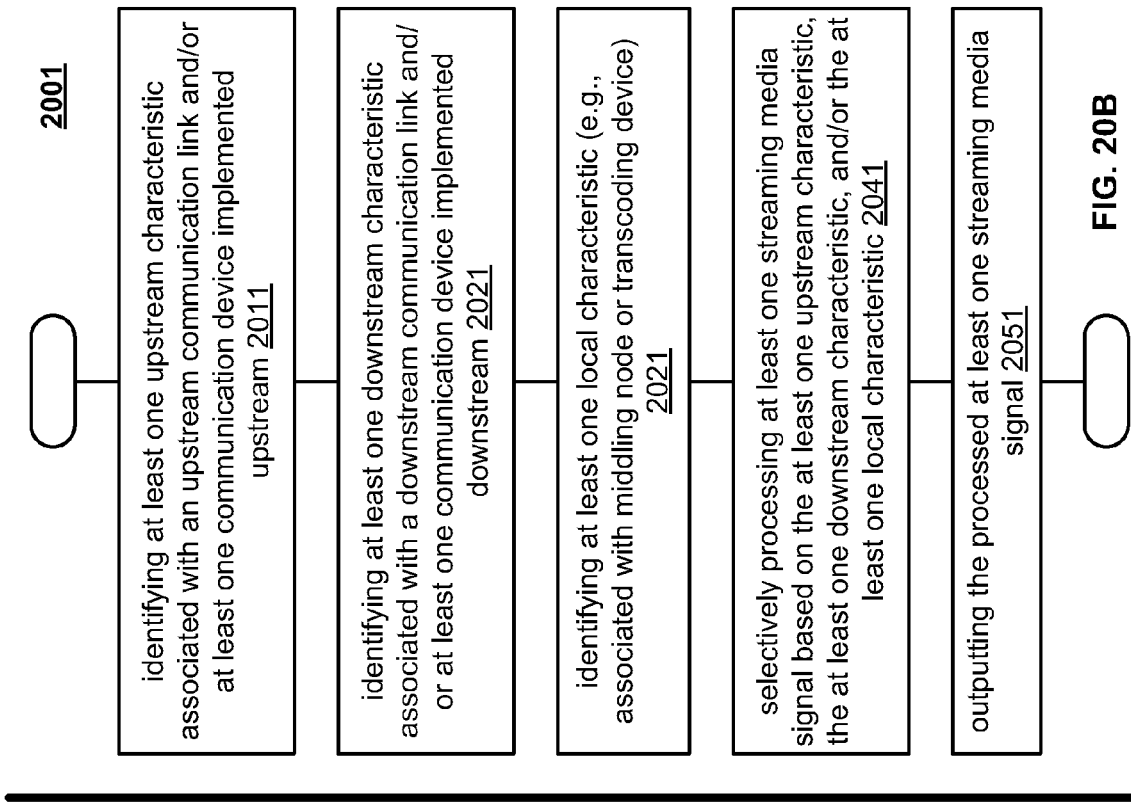
Figure 20A:
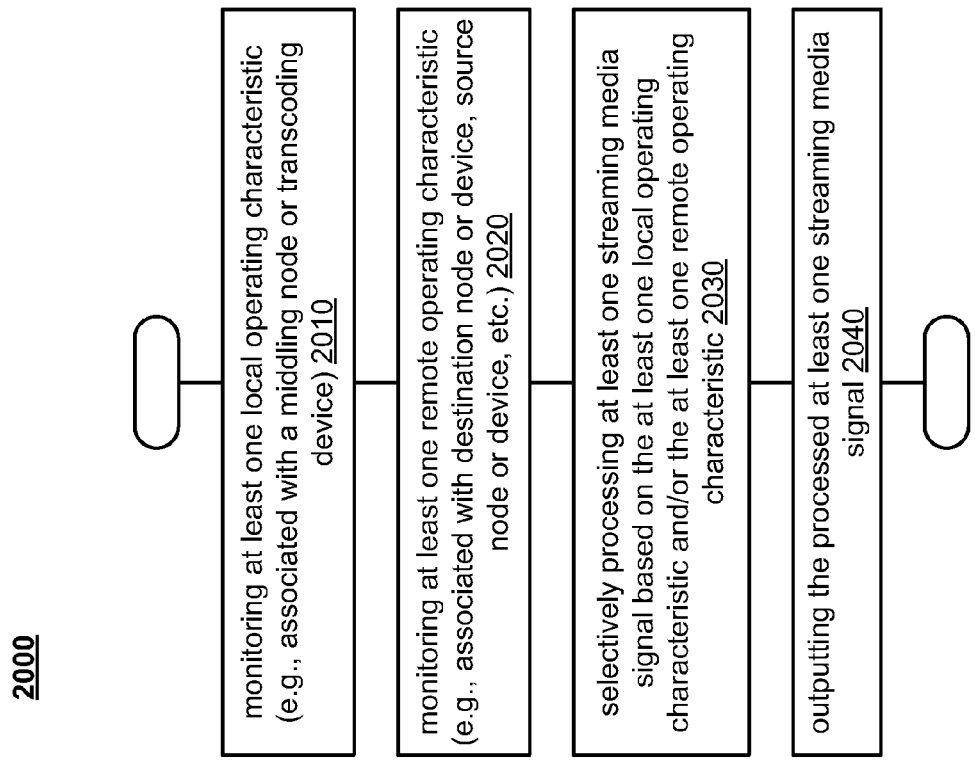

Referring to the method 2000 of FIG. 20A, the method 2000 operates by monitoring at least one local operating characteristic, as shown in a block 2010. For example, such a local operating characteristic may be associated with a middling node or transcoding node. Such a local operating characteristic may be any one or more of usage information, processing history, queuing, an energy constraint, a display size, a display resolution, and/or a display history, etc. associated with a given device such as a middling note or transcoding node.

The method 2000 also operates by monitoring at least one remote operating characteristic, as shown in a block 2020. For example, such a remote operating characteristic may be associated with a destination node or device, a source node or device, etc. Such a remote operating characteristic may be any one or more of usage information, processing history, queuing, an energy constraint, a display size, a display resolution, and/or a display history, etc. associated with a given remotely implemented device (e.g., a remotely implemented middling note, transcoding node, source device, destination device, etc.).

In other embodiments, such a remote operating characteristic may be associated with one or more communication links, one or more communication networks, etc. to which one or more communication devices is connected and/or operatively in communication with. For example, such a remote operating characteristic may be associated with latency, delay, noise, distortion, crosstalk, attenuation, signal to noise ratio (SNR), capacity, bandwidth, frequency spectrum, bit rate, and/or symbol rate corresponding to one or more communication links, one or more communication networks, etc.

The method 2000 also operates by selectively processing at least one streaming media signal based on the at least one local operating characteristic and/or the at least one remote operating characteristic, as shown in a block 2030. In some embodiments, such selective processing is performed in a block 2030 is particularly performed based on consideration of both the at least one local operating characteristic and the at least one remote operating characteristic. The method 2000 operates by outputting the processed at least one streaming media signal, as shown in a block 2040. Again, as with respect to other embodiments and/or diagrams described herein, such an outputted signal may be viewed as being provided to any one or more destination devices via any one or more communication links, networks, etc.

Referring to the method 2001 of FIG. 20B, the method 2001 operates by identifying at least one upstream characteristic associated with an upstream communication link and/or at least one communication device implemented upstream, as shown in a block 2011. The method 2001 also operates by identifying at least one downstream characteristic associated with the downstream communication link and/or at least one communication device and when the downstream, as shown in a block 2021. The method 2001 additionally operates by identifying at least one local characteristic, as shown in a block 2021. Such a local characteristic may be viewed as being associated with a middling node, or transcoding device, within which at least part of or some of the operational steps of the method 2001 are performed.

The method 2001 also operates by selectively processing at least one streaming media signal based on the at least one upstream characteristic, the at least one downstream characteristic, and/or the at least one local characteristic, as shown in a block 2041.

Figure 21B:
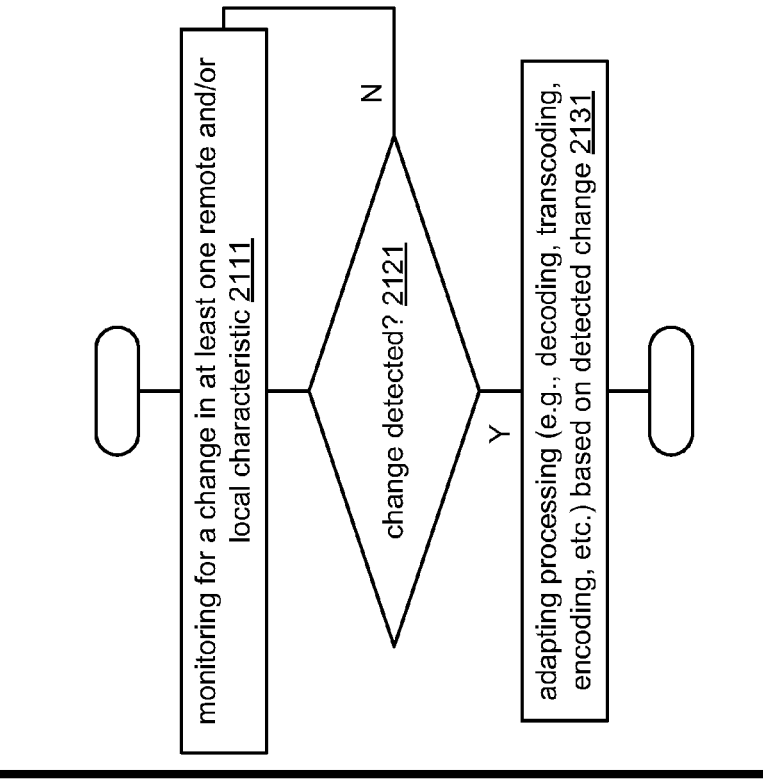
Figure 21A:
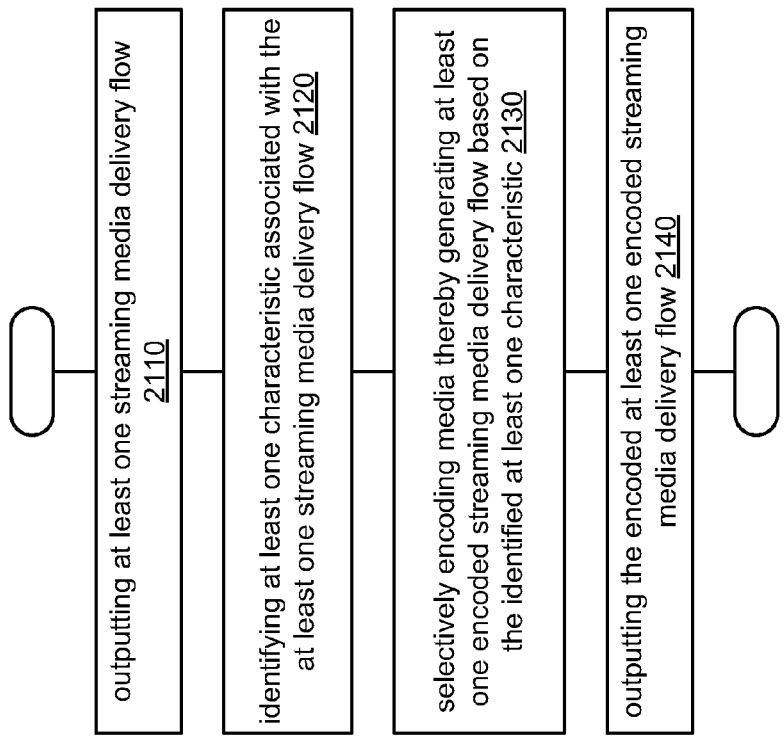

Referring to the method 2100 of FIG. 21A, the method 2000 operates by outputting at least one streaming media delivery flow, as shown in a block 2110. The method 2100 also operates by identifying at least one characteristic associated with the at least one streaming media delivery flow, as shown in a block 2120. For example, from a given communication device, such as a middling node, or a transcoder, at least one characteristic associated with at least one streaming media delivery flow provided there from may be identified. In another example, from a given communication device, such as a transmitter node, or an encoder, the at least one characteristic associated with the at least one streaming media delivery flow provided there from may be identified. Generally speaking, such operations as performed within the blocks 2110 and 2120 may be viewed as being performed within either a transcoder or an encoder type device.

The method 2100 also operates by selectively encoding media thereby generating at least one encoded streaming media delivery flow based on the identified at least one characteristic, as shown in a block 2130. That is to say, based upon one or more characteristics associated with the streaming media delivery flow, which may include characteristics associated with the actual encoded media being delivered, one or more communication links, one or more communication networks, one or more destination devices, etc., the method 2100 selectively operates by encoding the media. The method 2100 also operates by outputting encoded at least one encoded streaming media delivery flow, as shown in a block 2140.

Referring to the method 2101 of FIG. 21B, the method 2101 operates by monitoring for a change in at least one remote and/or local characteristic, as shown in a block 2111. As may be understood with respect to the various embodiments and/or diagrams included herein, any of a variety of local and/or remote characteristics may be employed. For example, certain local characteristics may be viewed as corresponding to a given communication device in which one or more of the operational steps of the method 2101 are being performed (e.g., a middling node, transcoder, a transmitter, an encoder, the receiver, a decoder, a transceiver, etc.). The method 2101 also operates by determining whether or not a change has been detected, as shown in a decision block 2121. In some embodiments, such detection of a change of one or more characteristics may be made based upon one or more thresholds. For example, a change may be determined as being detected when such a change exceeds one or more thresholds. In other embodiments, such a change may be viewed as being a percentage change of a given measurement (e.g., such as a percentage change of signal-to-noise ratio (SNR) of the communication channel, bit rate and/or symbol rate that may be supported by communication channel, etc.).

As may be seen within the block 2131, the method 2101 operates by adapting any one or more desired processing operations based on the detected change. For example, if one or more changes have been detected, then adaptation may be performed with respect to any one or more desired processing operations (e.g., decoding, transcoding, encoding, etc.).

It is noted that the respective methods described herein may be applied to a number of different application contexts. For example, a number of different varieties of transcoding, encoding, multiple standard protocol transcoding and/or encoding implementations are described herein. For example, in certain embodiments, a real-time transcoding environment is implemented such that scalable video coding (SVC) may be implemented in accordance with one or both of upstream and/or downstream consideration with respect to such a middling device or transcoder. For example, such a middling device or transcoder may be of limited to coordinate upstream SVC with downstream SVC, and vice versa. Such coordination between different respective directions may also include sharing internal information regarding real-time information corresponding to availability of processing resources, current operating conditions (e.g., including environmental considerations), memory and memory management conditions, etc. Generally speaking, any combination of local and/or remote characteristics associated with communication links, communication networks, source devices, destination devices, middling no devices, etc. may be used in accordance with operating such a real-time transcoding environment. In addition, consideration with respect to one or more feedback or control signals provided between different respective devices may be used to direct and adapt such transcoding operations. Considering one particular implementation of a source device, a middling node or transcoder device, and the destination device, appropriate control signaling may be provided between these respective devices using any desired implementation including one or more communication protocols and/or standards or one or more proprietary standard channels.

Moreover, with respect to embodiments operating in accordance with different types of entropy coding, switching between context adaptive and non-context adaptive entropy coding, including those which may operate in accordance with syntax or without syntax, may be made and operative in accordance with the various method embodiments and/or diagrams to ensure servicing of media between at least two respective nodes within the communication system (e.g., to ensure meeting the needs of a given end-to-end media consumption pathway). As may be understood with respect to such operations, transitioning between one or more end to end (E-E) configurations midstream can occur upon reference frame transitions with appropriate header information leadoff in a bitstream. For example, a given device, such as an encoder or transcoder, can make a decision to transition independently or under the direction or control (e.g., such as with respect to feedback or control signaling) from one or more other devices (e.g., a source or transmitter device, or alternatively a destination receiver device) within the communication system. Generally speaking, feedback or control signaling from any one or more other nodes within the communication system made provide information by which such adaptation between such different respective types of coding (e.g. switching between context adaptive and non-context adaptive entropy coding, including those operating with syntax or without syntax) may be made.

In addition, with respect to embodiments operating in accordance with selecting and/or re-selecting midstream between a number of different available coding standards (e.g., or profiles among one or more coding standards, or subsets of profiles among one or more coding standards, etc.), such adaptation may be made with respect to any of these various types of characteristics described herein including remote and or local characteristics associated with respective devices, medication links, communication networks, etc.

It is also noted that the various operations and functions as described with respect to various methods herein may be performed within a communication device, such as using a baseband processing module and/or a processing module implemented therein and/or other component(s) therein.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "module", "processing circuit", and/or "processing unit" (e.g., including various modules and/or circuitries such as may be operative, implemented, and/or for encoding, for decoding, for baseband processing, etc.) may be a single processing device or a plurality of processing devices. Such a processing device may be a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory (ROM), random access memory (RAM), volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A middling device comprising:
a communication interface; and
a processor, the communication interface and the processor configured to:
  receive, from a source device, a first streaming media flow and a first control signal that indicates a first encoding configuration used by the source device to generate the first streaming media flow;
  process the first streaming media flow to determine a first characteristic of the first streaming media flow;
  transcode the first streaming media flow to generate a first portion of a second streaming media flow based on a codec that is selected from a plurality of codecs based on the first control signal and the first characteristic;
  transmit, to a destination device, the first portion of the second streaming media flow and a second control signal that indicates a second encoding configuration used by the middling device to generate the second streaming media flow;
  receive, from the destination device, a third control signal that indicates a second characteristic of the first portion of the second streaming media flow as determined by the destination device; and
  adapt transcoding of the first streaming media flow to generate a second portion of the second streaming media flow based on the second characteristic and transmit the second portion of to the destination device.

2. The middling device of claim 1, wherein the communication interface and the processor are further configured to:
adapt transcoding of the first streaming media flow to generate the second streaming media flow based on the second characteristic by at least one of modifying a parameter of the second encoding configuration or selecting another codec from the plurality of codecs based on the first control signal and the first characteristic.

3. The middling device of claim 1, wherein the communication interface and the processor are further configured to:
receive, from the source device, an updated first control signal that indicates an updated first encoding configuration used by the source device; and
adapt transcoding of the first streaming media flow to generate the second streaming media flow based on the updated first control signal.

4. The middling device of claim 1, wherein:
the first characteristic of the first streaming media flow corresponds to at least one of latency, delay, noise, distortion, crosstalk, attenuation, SNR, capacity, bandwidth, frequency spectrum, bit rate, or symbol rate associated with the first streaming media flow; and
the second characteristic of the second streaming media flow corresponds to at least one of latency, delay, noise, distortion, crosstalk, attenuation, SNR, capacity, bandwidth, frequency spectrum, bit rate, or symbol rate associated with the second streaming media flow.

5. The middling device of claim 1, wherein the third control signal also indicates at least one of user usage information, processing history, queuing, an energy constraint, a display size, a display resolution, or a display history associated with the destination device.

6. The middling device of claim 1, wherein the communication interface and the processor are further configured to:
transcode the first streaming media flow to generate a third streaming media flow based on another codec selected from the plurality of codecs based on the first encoding configuration and the first characteristic;
transmit, to another destination device, the third streaming media flow and a fourth control signal that indicates a third encoding configuration used by the middling device to generate the third streaming media flow;
receive, from the another destination device, a fifth control signal that indicates a third characteristic of the third streaming media flow as determined by the another destination device; and
adapt transcoding of the first streaming media flow to generate the third streaming media flow based on the fifth control signal.

7. The middling device of claim 1, wherein the communication interface and the processor are further configured to:
transcode the first streaming media flow to generate the second streaming media flow based on the codec selected from the plurality of codecs based also on historical information related to prior transcoding of another first streaming media flow received from the source device.

8. The middling device of claim 1 further comprising:
the communication interface operative within at least one of a satellite communication system, a wireless communication system, a wired communication system, or a fiber-optic communication system.

9. A middling device comprising:
a communication interface; and
a processor, the communication interface and the processor configured to:
receive, from a source device, a first streaming media flow and a first control signal that indicates a first encoding configuration used by the source device to generate the first streaming media flow;
process the first streaming media flow to determine a first characteristic of the first streaming media flow;
transcode the first streaming media flow to generate a first portion of a second streaming media flow based on a codec that is selected from a plurality of codecs based on the first control signal, the first characteristic, historical information related to prior transcoding of another first streaming media flow received from the source device, and at least one of user usage information, processing history, queuing, an energy constraint, a display size, a display resolution, or a display history associated with a destination device;
transmit, to the destination device, the first portion of the second streaming media flow and a second control signal that indicates a second encoding configuration used by the middling device to generate the second streaming media flow;
receive, from the destination device, a third control signal that indicates a second characteristic of the first portion of the second streaming media flow as determined by the destination device; and
adapt transcoding of the first streaming media flow to generate a second portion of the second streaming media flow based on the second characteristic by at least one of modifying a parameter of the second encoding configuration or selecting another codec from the plurality of codecs based on the first control signal and the first characteristic and transmit the second portion of to the destination device.

10. The middling device of claim 9, wherein the communication interface and the processor are further configured to:
receive, from the source device, an updated first control signal that indicates an updated first encoding configuration used by the source device; and
adapt transcoding of the first streaming media flow to generate the second streaming media flow based on the updated first control signal.

11. The middling device of claim 9, wherein:
the first characteristic of the first streaming media flow corresponds to at least one of latency, delay, noise, distortion, crosstalk, attenuation, SNR, capacity, bandwidth, frequency spectrum, bit rate, or symbol rate associated with the first streaming media flow; and
the second characteristic of the second streaming media flow corresponds to at least one of latency, delay, noise, distortion, crosstalk, attenuation, SNR, capacity, bandwidth, frequency spectrum, bit rate, or symbol rate associated with the second streaming media flow.

12. The middling device of claim 9, wherein the communication interface and the processor are further configured to:
transcode the first streaming media flow to generate a third streaming media flow based on another codec selected from the plurality of codecs based on the first encoding configuration and the first characteristic;
transmit, to another destination device, the third streaming media flow and a fourth control signal that indicates a third encoding configuration used by the middling device to generate the third streaming media flow;
receive, from the another destination device, a fifth control signal that indicates a third characteristic of the third streaming media flow as determined by the another destination device; and
adapt transcoding of the first streaming media flow to generate the third streaming media flow based on the fifth control signal.

13. The middling device of claim 9 further comprising:
the communication interface operative within at least one of a satellite communication system, a wireless communication system, a wired communication system, or a fiber-optic communication system.

14. A method for execution by a middling device, the method comprising:
   receiving, from a source device via a communication interface of the middling device, a first streaming media flow and a first control signal that indicates a first encoding configuration used by the source device to generate the first streaming media flow;
   processing the first streaming media flow to determine a first characteristic of the first streaming media flow;
   transcoding the first streaming media flow to generate a first portion of a second streaming media flow based on a codec that is selected from a plurality of codecs based on the first control signal and the first characteristic;
   transmitting, to a destination device via the communication interface, the first portion of the second streaming media flow and a second control signal that indicates a second encoding configuration used by the middling device to generate the second streaming media flow;
   receiving, from the destination device via the communication interface, a third control signal that indicates a second characteristic of the first portion of the second streaming media flow as determined by the destination device; and
   adapting the transcoding of the first streaming media flow to generate a second portion of the second streaming media flow based on the second characteristic and transmit the second portion of to the destination device.

15. The method of claim 14 further comprising:
   adapting the transcoding of the first streaming media flow to generate the second streaming media flow based on the second characteristic by at least one of modifying a parameter of the second encoding configuration or selecting another codec from the plurality of codecs based on the first control signal and the first characteristic.

16. The method of claim 14 further comprising:
   receiving, from the source device, an updated first control signal that indicates an updated first encoding configuration used by the source device; and
   adapting the transcoding of the first streaming media flow to generate the second streaming media flow based on the updated first control signal.

17. The method of claim 14, wherein:
   the first characteristic of the first streaming media flow corresponds to at least one of latency, delay, noise, distortion, crosstalk, attenuation, SNR, capacity, bandwidth, frequency spectrum, bit rate, or symbol rate associated with the first streaming media flow; and
   the second characteristic of the second streaming media flow corresponds to at least one of latency, delay, noise, distortion, crosstalk, attenuation, SNR, capacity, bandwidth, frequency spectrum, bit rate, or symbol rate associated with the second streaming media flow.

18. The method of claim 14 further comprising:
   transcoding the first streaming media flow to generate a third streaming media flow based on another codec selected from the plurality of codecs based on the first encoding configuration and the first characteristic;
   transmitting, to another destination device, the third streaming media flow and a fourth control signal that indicates a third encoding configuration used by the middling device to generate the third streaming media flow;
   receiving, from the another destination device, a fifth control signal that indicates a third characteristic of the third streaming media flow as determined by the another destination device; and
   adapting the transcoding of the first streaming media flow to generate the third streaming media flow based on the fifth control signal.

19. The method of claim 14 further comprising:
   transcoding the first streaming media flow to generate the second streaming media flow based on the codec selected from the plurality of codecs based also on historical information related to prior transcoding of another first streaming media flow received from the source device.

20. The method of claim 14 further comprising:
   operating the communication interface of the middling device to support communications within at least one of a satellite communication system, a wireless communication system, a wired communication system, or a fiber-optic communication system.

* * * * *